US005121854A

United States Patent [19]

Trouteaud et al.

[11] Patent Number: 5,121,854

[45] Date of Patent: Jun. 16, 1992

[54] APPARATUS FOR STORING AND DISPENSING FROZEN COMESTIBLES

[75] Inventors: Lee E. Trouteaud, Huber Heights; Robert J. Hadick, Kettering, both of Ohio

[73] Assignee: Hobart Corporation, Troy, Ohio

[21] Appl. No.: 674,240

[22] Filed: Mar. 25, 1991

Related U.S. Application Data

[62] Division of Ser. No. 405,635, Jan. 16, 1990, Pat. No. 5,025,950.

[51] Int. Cl.[5] ........................ B65G 59/00; G07F 11/00

[52] U.S. Cl. ........................................ 221/15; 221/21; 221/88; 221/130; 221/131; 221/150 R; 221/192

[58] Field of Search ................... 221/87, 88, 123, 130, 221/131, 150 R, 150 HC, 192, 21, 15, 98, 102, 195, 196

[56] References Cited

U.S. PATENT DOCUMENTS

| | | | |
|---|---|---|---|
| 2,925,194 | 2/1960 | Mitialek | 221/150 R |
| 4,108,333 | 8/1978 | Falk et al. | 221/130 |
| 4,340,150 | 7/1982 | Guibard et al. | 221/21 |
| 4,668,150 | 5/1987 | Blumberg | 221/88 |
| 4,671,425 | 6/1987 | Knoll | 221/150 HC |
| 4,687,119 | 8/1987 | Juillet | 221/150 HC |
| 4,812,629 | 3/1989 | O'Neil et al. | 221/13 |
| 5,025,950 | 6/1991 | Trouteaud et al. | 221/150 R |

*Primary Examiner*—H. Grant Skaggs

*Attorney, Agent, or Firm*—Russell L. McIlwain; RObert J. Fox

[57] ABSTRACT

An apparatus and method for storing and dispensing comestibles, such as ice cream, has a cabinet defining an interior for holding a plurality of stacked ice cream containing magazines. A refrigeration system for cooling the interior of the cabinet below the freezing point of the ice cream is connected thereto. An X-Y picker assembly is positioned in the cabinet interior to transport ice cream from the selected magazine without heating the selected ice cream container or any other ice cream containers stored therein. The ice cream is carried by the X-Y picker assembly to a dispensing opening in the cabinet from which it can be accessed by the consumer. A nonvolatile information storage device is associated with the plurality of magazines and contains product characteristic information therein related to the flavors of ice cream in the magazines. A mapping system maps switch closures from product selection switches with the product characteristic information.

6 Claims, 34 Drawing Sheets

FACTORY LOADING OF MAGAZINES

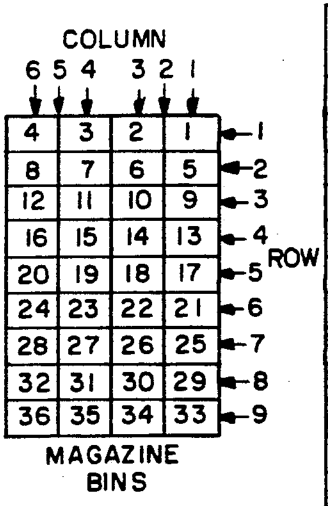
FIG. 16
| MAGAZINE POSITION | PICKER TRAVEL TO: ROW | COLUMN | MAGAZINE POSITION | PICKER TRAVEL TO: ROW | COLUMN |
|---|---|---|---|---|---|
| 1 | 1 | 1 | 20 | 5 | 6 |
| 2 | 1 | 3 | 21 | 6 | 1 |
| 3 | 1 | 4 | 22 | 6 | 3 |
| 4 | 1 | 6 | 23 | 6 | 4 |
| 5 | 2 | 1 | 24 | 6 | 6 |
| 6 | 2 | 3 | 25 | 7 | 1 |
| 7 | 2 | 4 | 26 | 7 | 3 |
| 8 | 2 | 6 | 27 | 7 | 4 |
| 9 | 3 | 1 | 28 | 7 | 6 |
| 10 | 3 | 3 | 29 | 8 | 1 |
| 11 | 3 | 4 | 30 | 8 | 3 |
| 12 | 3 | 6 | 31 | 8 | 4 |
| 13 | 4 | 1 | 32 | 8 | 6 |
| 14 | 4 | 3 | 33 | 9 | 1 |
| 15 | 4 | 4 | 34 | 9 | 3 |
| 16 | 4 | 6 | 35 | 9 | 4 |
| 17 | 5 | 1 | 36 | 9 | 6 |
| 18 | 5 | 3 | DELIVERY LEFT | 7 | 2 |
| 19 | 5 | 4 | DELIVERY RIGHT | 7 | 5 |
FIG. 17
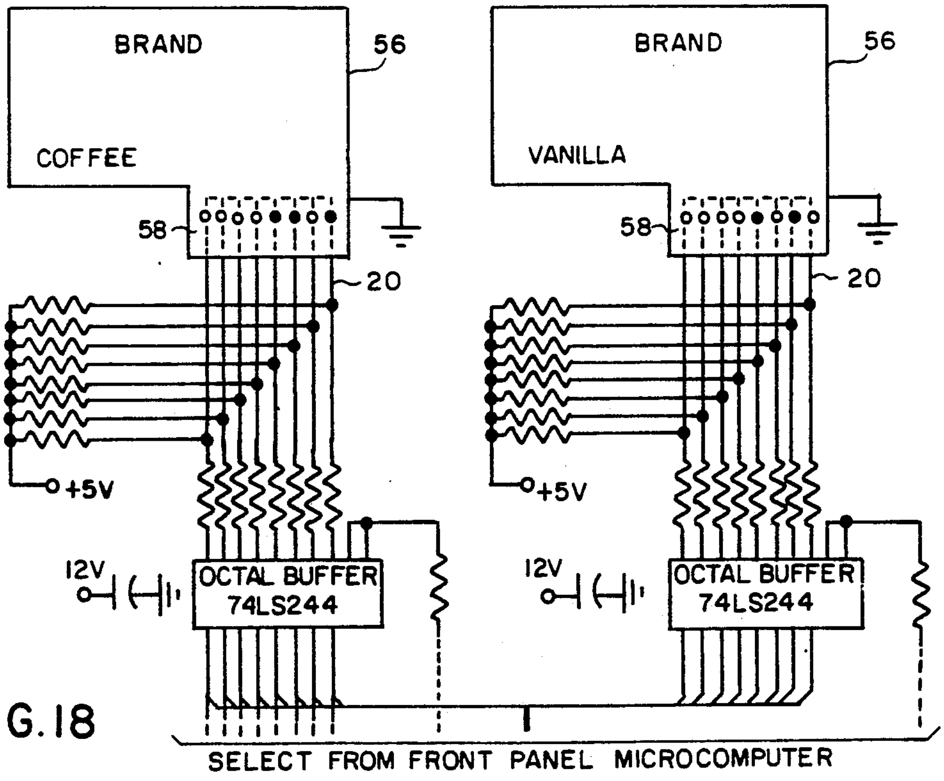
FIG. 18

192
JP19
C25
+12V
LIMIT VERT.
324

LIMIT HORIZ.
604

HORIZ. BRAKE
602

VERT. BRAKE
600
D9
D8
L
+12V
R24
590
592
U8
RELAY
U9
RELAY
R58
+5V
C16
LIMIT SW RELEASE
U2D
589
JP8
R23
R59
C40
C39
HOME POS. VERT.
330
LOAD POS. VERT.
328
C4
C7
R37
R18
R21
R19
JP12
C1
TOP VERT. SENSOR
582
BOT. VERT. SENSOR
584
586
588
R1
R2
R7
R8
LEVEL SHIFTER 74HC4050
U5
580
1A 2A 3A 4A 5A 6A GND
1Y 2Y 3Y 4Y 5Y 6Y VCC

U10E
U6B
U51Y
U52Y
U53Y
U54Y
+5V
C22

192

MAG. SW. 1
MAG. SW. 2
DOOR SW.
RETURN BIN SW.
ICE CREAM SW. 2
ICE CREAM SW. 1
UR3
+12V
614
616
622
626
335b
335a
UR2
C34
C35
C36
C37
JP2
R30
+5V
JP10
R31
TEST MODE JUMPER
630
DISPLAY/LAMPS JUMPER
LEVEL SHIFTER 74HC4050
1A
2A
3A
4A
5A
6A
GND
1Y
2Y
3Y
4Y
5Y
6Y
VCC
U1
C24
U6A
JP5
C8
C38
U3A
U3B
U3C
U3D
U3E
U3F
U2D
U51Y
U73Y
JP7
JP6
UD6

U10C
U10B
U10A
U74Y
U75Y
U76Y
U2E
U17C

U2F
U2B
U2C

U52Y
U53Y
U54Y

U17B
U2A

236

APPARATUS FOR STORING AND DISPENSING FROZEN COMESTIBLES

BACKGROUND OF THE INVENTION

The instant invention generally relates to an apparatus for storing and dispensing frozen comestibles in a freezer unit. In particular, the invention relates to an apparatus for storing and dispensing frozen comestibles which substantially isolates the comestibles in a controlled thermal environment to prevent them from thawing. The apparatus also dispenses the comestibles automatically by using handling equipment maintained at the same temperature as the comestibles in order to prevent thawing of comestibles remaining in frozen storage immediately adjacent those being dispensed during a selected dispensing cycle.

It is well known that many people today often wish to reward themselves by the small indulgence of having a high quality ice cream. The market for high quality ice creams has grown greatly in the last 15 to 20 years as a result of this increased demand. The high quality ice creams sold in this market are often made from substantially natural ingredients and often have a high butterfat content in order to provide a pleasing taste to the discriminating purchaser. These high quality ice creams are often distributed by ice cream stores in hand-packed containers, but, more recently, are being sold through mass market stores such as supermarkets and the like.

It is well known that such ice cream is typically sold in freezer units having open tops which are exposed to handling by the public. While the freezer units typically maintain their temperature at −15° F. to −20° F., it is apparent that, since the top is open, anyone wishing to inspect the ice cream can reach in, touch the ice cream and move it about. The person looking for a particular flavor of ice cream thus may handle a number of cartons or containers of ice cream while searching for the flavor that he or she wants. As the customers handle the ice cream, they tend to heat small portions of it which may melt and then quickly refreeze leading to deterioration in the quality of the ice cream. The relatively high temperature of the person's hand touching the ice cream is almost 100° F. or higher than the temperature of the ice cream, leading to rapid heat transfer into the ice cream and sometimes localized melting. In addition, it may be appreciated that, since the prior art freezer units are not substantially enclosed, there may be temperature gradients and, if the ice cream is over-packed, there may be partial melting of the ice cream near the top of the unit. As a result of the partial melting of the ice cream, the ice cream will often later refreeze but with portions of the ice cream having stratified out of the liquid solution and with the water, upon refreezing, forming ice crystals. While this is not desirable, it may be tolerated by persons purchasing low cost ice cream on the theory that they have not spent a great deal of money. However, this is clearly unacceptable for persons spending a great deal of money for a high quality ice cream in which taste and texture are all important.

Other freezer units have been developed which dispense ice cream through front opening doors. It is clear that with these units, when the doors are open, a great deal of cold air drops out of the bottom of the door opening while warm air rushes into the upper portions of the freezer unit allowing the ice cream at the top and, in particular, the top and front of the freezer to be heated. Additionally, the ice cream is subjected to handling which may cause the ice cream to thaw. This is due to the fact that the ice cream, while having been stacked neatly to begin with, may have been moved around by the customers and become stacked haphazardly.

The same product deterioration problems may be encountered with conventional freezer units because of the manner in which they are stocked with ice cream. Typically, ice cream is packed on a refrigerated truck on skids, pallets or the like. When the ice cream is delivered to the retailer, it is unloaded from the truck and loaded by hand into conventional display type freezers. As a result of the fluctuating to which the ice cream is exposed, as well as the manual handling, the ice cream may be melted and refrozen leading to a deterioration in quality as set forth above.

A number of handling schemes have been devised for other types of products where, in particular, it is desirable to maintain the physical security of an item but allow one to receive the item through a dispenser after the product has been selected. In particular, see U.S. Pat. No. 4,789,054 to Shore, et al. for Vending Machine For Returnable Cartridges which discloses a vending machine for vending reusable articles, in this case, video cassettes and containers See also U.S. Pat. No. 4,812,629 to O'Neil, et al for Method and Apparatus for Vending which also discloses a video cassette vending machine having a video cassette handling system including a storage rack 12 in which are placed video cassettes and from which they may be selected by a carrier means for carrying the video cassettes between one of the storage positions and the vend position 17. Note, in particular, that the carrier means 35 includes a vertical rod 42 and a horizontal rod 46 comprising geared racks. The carrier means 35 is operated under the control of the microprocessor system 104.

U.S. Pat. No. 4,839,505 to Bradt, et al. for Apparatus and Method for Storing and Retrieving Articles discloses a machine for dispensing rental videocassettes. The system includes a picker assembly 148 which is movable in the r, theta and z directions for selecting videocassettes from a carousel type storage arrangement.

Although the O'Neil, et al., Shore, et al. and Bradt, et al. systems include a carrier means or vending means, it may be appreciated that the environment within which the video cassettes are stored is not temperature controlled. In other words, the video cassettes are selected by the carrier means in order that inadvertent vending of a video cassette does not take place which might allow a thief to make off with the video cassette without having paid for it.

What is needed then is a storage and dispensing system for insuring that frozen comestibles, once they are to be shipped, are maintained in a temperature controlled environment to prevent them from deteriorating due to unwanted fluctuations in the temperatures to which they are exposed. The apparatus and method also should prevent the frozen comestibles from being manually handled until dispensing actually takes place, which dispensing is subsequent to a selection having been made.

SUMMARY OF THE INVENTION

A number of the difficulties encountered with prior art freezer devices are solved by the instant invention.

The apparatus, according to the present invention, includes a cabinet having a refrigerator connected to it for cooling the interior of the cabinet. A plurality of food product selection switches are located on the exterior of the cabinet so that a user may select a particular food product, typically a particular flavor of ice cream. Associated with the food product selection switches are food product code sensors which may read a product code from a removable transparency held adjacent the food product selection switch. Typically, the transparency has an attractive photograph of the ice cream, an identification of its flavor and possibly other information associated therewith, so that the consumer may make an informed selection of the particular ice cream which is desired. Positioned within the cabinet are product characteristic storage means which include a random access memory loaded with information related to the flavors of the ice cream loaded within bins of a magazine. Mapping means are associated with the product characteristic means to cause product selection signals, generated by actuation of the food product selection switches, to be mapped with the product characteristic storage information signals so that an X-Y picker assembly may be controlled to select the appropriate ice cream containers from the magazine assemblies contained within the cabinet of the apparatus. The X-Y picker assembly is completely contained within the cabinet and is maintained at the same temperature as the magazines by the refrigeration equipment. In this manner, the portion of the picker assembly that actually touches the ice cream does not cause it to melt when it is being handled. In addition, since the system is completely sealed, it is unnecessary for a person looking for a particular flavor of ice cream to handle any of the ice cream. They may merely make their selection from the appropriate product selection switch on the outside of the cabinet. Since the location of each flavor is mapped into the apparatus, it is unnecessary to handle any ice cream other than ice cream which actually was selected by the consumer. This avoids thawing of the ice cream due to moving it about by hand while searching for a particular flavor. In the event that the ice cream having the selected flavor has been exhausted from the apparatus, a product out signal will be generated causing a visual indication to be produced so that the consumer is informed that his or her selection is then unavailable.

One particular advantage of the instant apparatus is that the ice cream loaded within the magazines need not be viewed by the person making the selection. In order to make sure that the ice cream remains completely sealed in its cooled state, the magazine assemblies made up of the stacked bins are loaded at a factory at which the ice cream is made. The loading takes place at temperatures below the freezing point of the ice cream in order to preserve its flavor, texture and other desirable characteristics. Each bin is loaded with six half-gallons of a particular flavor ice cream. Each of the magazines has associated with it a random access memory storage device of the nonvolatile type such as a CMOS RAM memory with a battery back-up power supply or an electrically erasable random access memory or the like, having product information coded therein related to the type of product or flavor of ice cream in each of the bins. For instance, the bin in the upper left-hand corner of the magazine bins may contain chocolate ice cream while the bins in the entire second tier of the magazine may contain vanilla ice cream. The product information is securely associated with the magazines by securely fastening the nonvolatile memory storage device to the magazine for shipment. The magazines are shipped in refrigerated trucks and, upon delivery at the retailer, immediately moved into the refrigerated cabinets of the inventive apparatus in order to prevent thawing or other temperature related deterioration of the ice cream. The nonvolatile memory device is, at the same time, electrically connected to other portions of the electrical system of the apparatus. Information from the nonvolatile memory device is automatically loaded into a system memory whenever access doors to the cabinet for the apparatus are open, thus insuring that whenever access is had to the magazines, which might possibly change the contents of the magazines, the information related to the magazine assemblies is remapped into the product selection mapping memory so that an accurate characterization of the product inventory is available for the system.

Since the apparatus maintains the ice cream in the cooled state until it exits the machine, it is clear that it prevents deterioration of the ice cream due to thawing and refreezing, as has so often occurred with the prior art systems. The use of the picker mechanism maintained at the refrigerated temperature allows the apparatus to make selections of the ice cream and handle ice cream containers without causing the ice cream to thaw or to be damaged.

The picker assembly, in particular, is adapted to operate in a low temperature, high humidity environment in which frost may be formed. Although other picker assemblies have been shown in the prior art, none of them are particularly adapted for use in refrigerated environments. One of the inventive features of the instant picker assembly is the use of magnetic sensors and, in particular, Hall effect position sensors positioned along various portions of the picker assembly so that position information regarding the picker may be supplied to the electronic portions of the system for measurement and control purposes. Other position indicators have used optical position sensors in the past, however, we have found that such optical position sensors cannot be used in a high humidity, low temperature environment due to the fact that frost and ice are formed on the sensors under typical operating conditions and block the optical paths between the light emitting diodes and the photo diodes or photo-transistors of a typical sensor pair.

In order to allow the system to be remotely operable and autonomous, a modem is provided within the electronic control system so that the system including the mapping means can be interrogated from remote locations from time to time to determine the condition of the system, including such things as the amount of product left in the system as well as the temperature conditions or whether there have been any equipment failures. This remote interrogation facility allows the ice cream wholesaler, who may have installed the system within a selected retail store, to interrogate the system without the necessity of sending skilled personnel out to examine the system. It is clear that the system may be interrogated more often and that potential faults may be found through the use of the modem communication facility before a failure occurs in the system or before its inventory is completely exhausted.

It is a principal aspect of the present invention to provide an apparatus for storing frozen comestibles, such as ice cream, in a low temperature isothermal environment to prevent deterioration of the ice cream due to thawing.

It is another aspect of the present invention to provide an apparatus for storing frozen comestibles having internal X-Y handling apparatus maintained at the same temperature as is the stored ice cream to prevent the stored ice cream from deteriorating during handling and dispensing operations.

It is a still further aspect of the present invention to provide an apparatus for storing and dispensing frozen comestibles which allows the user to make a product selection from an external panel without touching the chilled comestible stored therein.

It is a still further aspect of the present invention to provide an apparatus for storing frozen comestibles within magazine storage units wherein locations of particular types of comestibles within the magazine storage units may be easily varied and their location electronically identified via a mapping system.

It is another aspect of the present invention to provide a method of storing and dispensing frozen comestibles wherein frozen comestibles are located within closed magazines at a remote location and a resulting magazine assembly is loaded directly into a refrigerated cabinet of a refrigeration apparatus at a retail site.

Other aspects of the present invention will become apparent to those having ordinary skill in the art from the specification and the claims in light of the accompanying drawings.

BRIEF DESCRIPTION OF THE DRAWINGS

FIG. 16 is a schematic rendering of the addressing of the bins by column and row number;

FIG. 17 is a schematic or tabular showing of the bin positions and the picker addressing to move one or the other of the pickers of the picker assembly into registration with the selected bin;

FIG. 18 is a schematic showing of the relationship between the transparencies and the information transfer circuitry associated therewith;

DESCRIPTION OF THE PREFERRED EMBODIMENT

Figure 1:
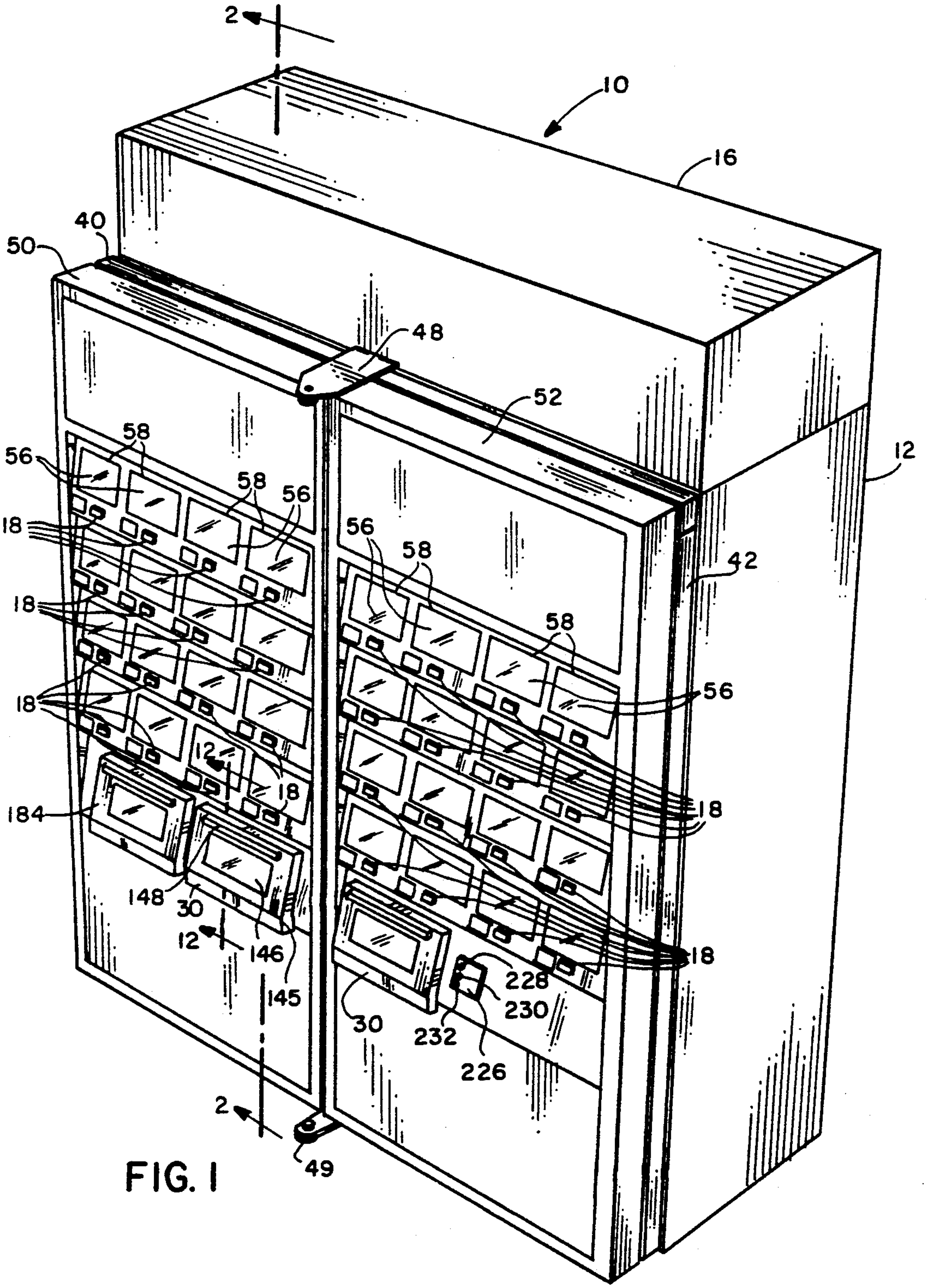
FIG. 1 is an isometric view of an apparatus for storing and dispensing frozen comestibles embodying the present invention.
Figure 2:
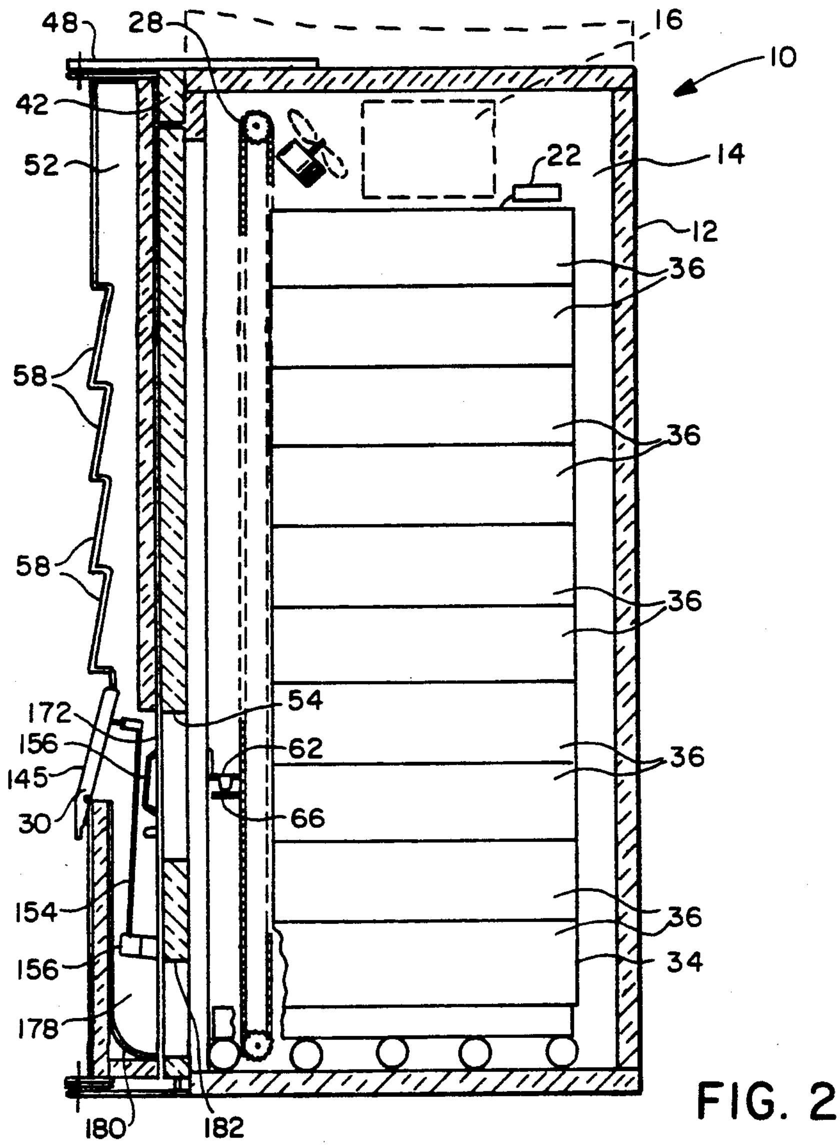
FIG. 2 is a sectional view of the apparatus of FIG. 1, taken along line 2—2, having a portion of a refrigeration unit broken away.

An apparatus 10 for storing and dispensing frozen comestibles is generally shown in FIGS. 1, 2, 3 and 4. The apparatus 10 includes a cabinet 12 having a refrigerated interior 14. Cooling means 16 for cooling the cabinet interior 14 is mounted in an upper portion of the cabinet for keeping the temperature within the cabinet at about −15° F. to −20° F. The cabinet 12 includes a plurality of food product selection switches 18 which may be actuated by a customer to cause delivery of a selected flavor ice cream from the interior 14 of the cabinet 12. Associated with each of the food product selection switches 18 is a food product code sensor 20 adapted to read a digital code stored in a transparency and showing a food product thereon, as may best be seen in FIG. 18. Product characteristic storage means 22, in this embodiment a pair of Dallas Semiconductor model no. DS1217A CMOS random access memories having battery back-up power supplies to make them nonvolatile and to maintain product information therein, are positioned within the interior 14 of the cabinet 12. Mapping means 24 and interrogating means 26 communicate with the product characteristic storage means 22 to move information from the product characteristic storage means 22 into the mapping means 24 where it can be accessed by interrogating means 26 when one of the product selection switches 18 is activated by a customer. Handling means 28, comprising a picker assembly, is positioned within the interior 14 of the cabinet 12 and maintained at −15° F. to −20° F., as are the portions of the interior 14. A pair of frozen comestible delivery stations 30, as may best be seen in FIG. 1, are positioned so that a customer may remove a product from them which has been transferred from the interior 14 of the cabinet 12 to one of the frozen comestible delivery stations 30 by the picker assembly 28. A pair of magazines 32 and 34, each made up of a plurality of bins 36 capable of holding six half-gallons of ice cream in each bin, may be removably positioned within the interior 14 of the storage cabinet 12. The bins 36 are loaded at a remote site, typically a factory where ice cream is produced, and are loaded under substantially isothermal conditions, that is at −15° F. to −20° F. to prevent deterioration of the ice cream by heating. Associated with the magazines 32 and 34 are the product characteristic storage means 22, in this case a storage medium comprised of the CMOS RAM data cartridges 22. The cartridges 22 are connected via anchor cables 38 to their respective magazines 32 and 34. This prevents the data in the CMOS RAMs 22 from being separated from the magazines 32 and 34 during shipment so that, although the magazine bins 36 remain sealed, information is available in the data cartridges 22 as to the contents of the magazine bins 36.

Figure 3:
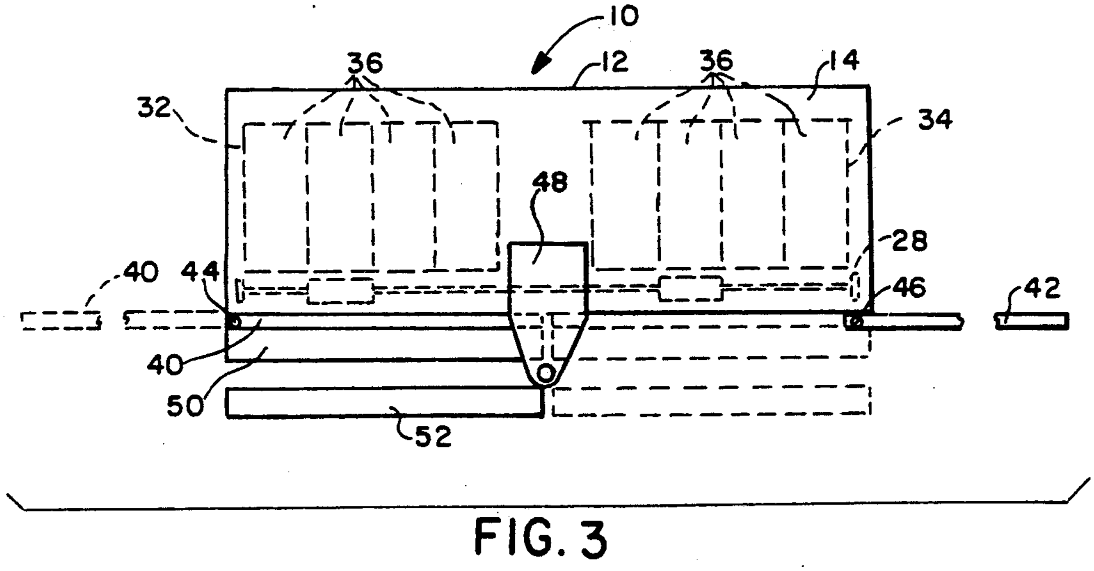
FIG. 3 is a top elevational view of the apparatus of FIG. 1 showing, in phantom, the position of a pair or interior. doors and a pair of exterior doors when opened.
Figure 4:
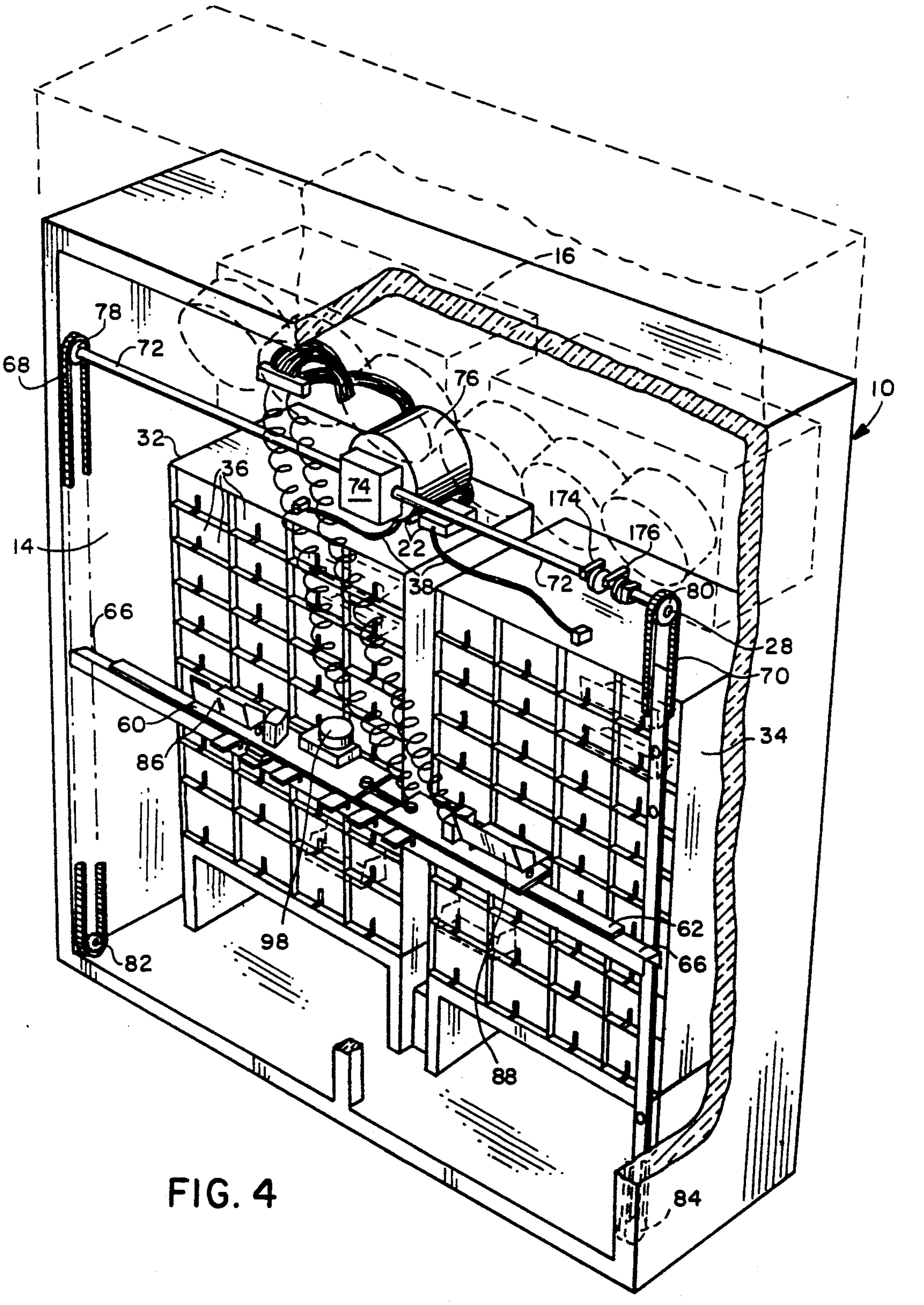
FIG. 4 is an isometric view of the apparatus of FIG. 1 having portions broken away to show interior details thereof including a picker mechanism and a pair of frozen food storage magazines.

As may best be seen in FIGS. 1 and 3, the cabinet 12 includes a pair of inner thermal doors 40 and 42 which are pivotable, respectively, about hinges 44 and 46 located at wall portions of the cabinet 12. A center hinge structure 48 suspends a pair of outer doors 50 and 52, which are pivotable thereabout. The inner doors 40 and 42 provide substantial thermal insulation over nearly their entire extent. Although, as may best be seen in FIG. 2, inner door 40 has a delivery aperture 54 formed therein so that frozen comestibles stored in the bins 36 may be transferred by the handling means 28 to the delivery station 30 for access by a consumer, the outer doors 50 and 52 also have the food product selection switches 18 and the food product code sensors 20 positioned thereon. Associated with each of the food product code sensors 20 is a removable transparency 56 which typically shows a dish of ice cream of a selected flavor as well as the ice cream brand name and possibly even the price. The transparency 56 also has a code section 58 associated therewith having a plurality of circular perforations therein to define a digital code which is sensed by the food product code sensor 20 when the transparency 56 is inserted into a transparency window 58 of the outer door 50 and 52. The transparency windows 58 may be illuminated from behind by appropriate lighting to provide an attractive and pleasing display for a customer The magazines 32 and 34 which have their bins 36 loaded with frozen comestibles, in this instance half-gallon containers of ice cream, are positioned within the interior 14 of the cabinet 12 where they are kept refrigerated. It may be appreciated that no contact is made with the ice cream in the bins 36 other than by the picker assembly 28 which is maintained at −15° F. to −20° F. by the refrigeration system 16. It may be noted that the use of a pair of magazines within the interior 14 of the cabinet 12 may allow one magazine to be replaced or removed from the system 10 while the other continues to dispense product, thereby assuring a continuous flow of product to the customers even while magazine exchange operations remote from the cabinet 12 are taking place.

Figure 8A:
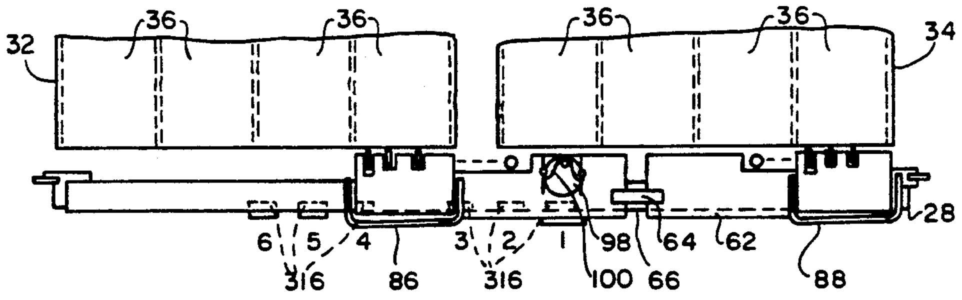
FIG. 8A is an elevational view of a portion of a picker assembly of the apparatus of FIG. 1 showing the orientation of the picker assembly with respect to one of the magazines.
Figure 8B:
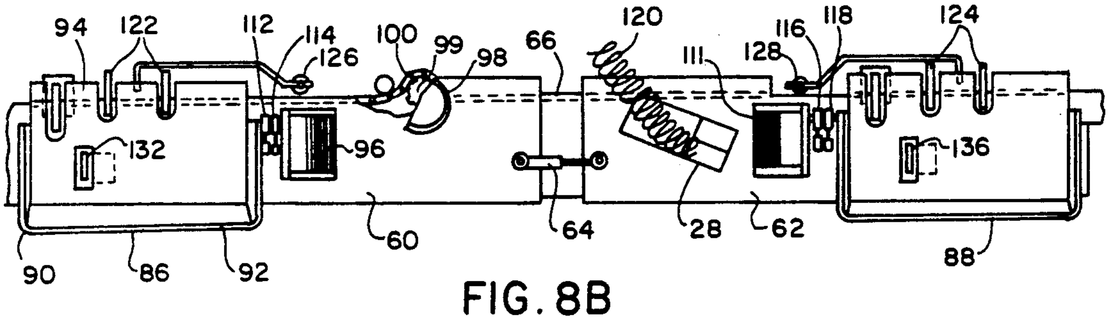
FIG. 8B is a detailed elevational view of the portion of the picker assembly in FIG. 8A.

Referring now, in particular, to FIGS. 8A and 8B, portions of the picker assembly 28 are shown therein. The picker assembly 28 includes a left-hand picker 60 and a right-hand picker 62. The two pickers are substantially identical and are joined by an adjustable link 64 so that the relative displacement between the picker 60 and the picker 62 may be easily controlled. The pickers 60 and 62 are horizontally movable along a horizontal track bar 66 to be brought into selective registration with the bins 36 and the delivery station 30. The horizontal track bar 66 is suspended from a first loop chain 68 and a second loop chain 70 disposed at opposite sides of the interior 14 of the cabinet 12. The loop chains 68 and 70 are driven by a drive shaft 72 connected to a transmission 74 having a vertical electrical motor 76 supplying driving energy thereto. The drive shaft 72 has a first end gear 78 and a second end gear 80, respectively engaging the loop chains 68 and 70, and an idler gear 82 and an idler gear 84 engaging the loop chains at lower portions of the cabinet 12. It may be appreciated that impetus from the vertical motor 76 causes the chains 68 and 70 to move, raising and lowering the horizontal track bar 66 of the picker assembly 28. The twin pickers 60 and 62 are movable horizontally along the bar 66 so that a rotatable ice cream transporter 86 may be brought into registration with one of the bins 36 of the magazine 32, or a rotatable ice cream transporter 88 may be brought into registration with one of the bins 36 of the magazine 34. The transporter 86 includes a bin or tray portion 90 having an upright section 92 and a normally horizontal or floor section 94. The tray 90 is connected to a transporter electric motor 96 so that the tray can be rotated with respect to the horizontal arm 66 of the picker assembly.

The picker 60 also has a horizontal electric motor 98 positioned thereon having a drive gear 99 engaging a fixed chain 100 so that when the horizontal motor 98 rotates, the fixed chain 100 causes the pickers 60 and 62 to move horizontally along the horizontal arm 66.

The transporter 88 includes an upright wall, 102 formed integral with a normally horizontal wall 104. A pivot 106, having a pivot aperture 108 formed therein, allows the tray 88 to be rotated about a pin 110 by a transporter electric motor 111.

Figure 9:
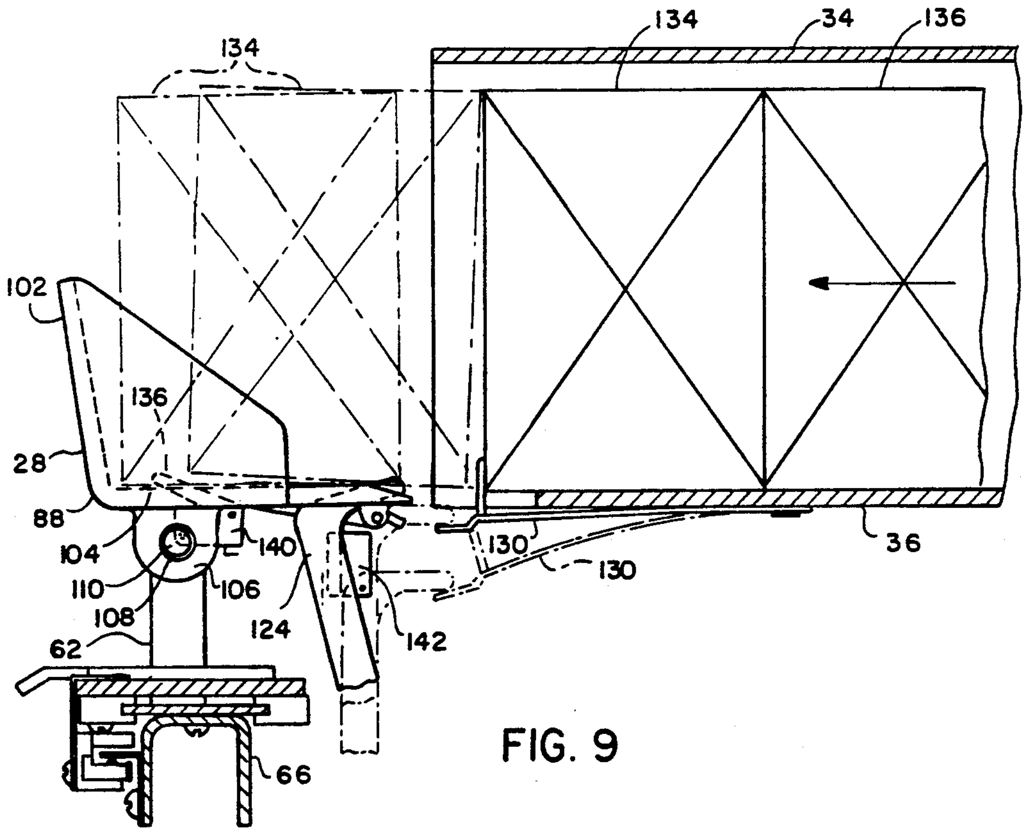
FIG. 9 is a sectional view of one of the magazines and a portion of the picker assembly showing details of the transfer of a half-gallon container of ice cream from the magazine to the picker.
Figure 10:
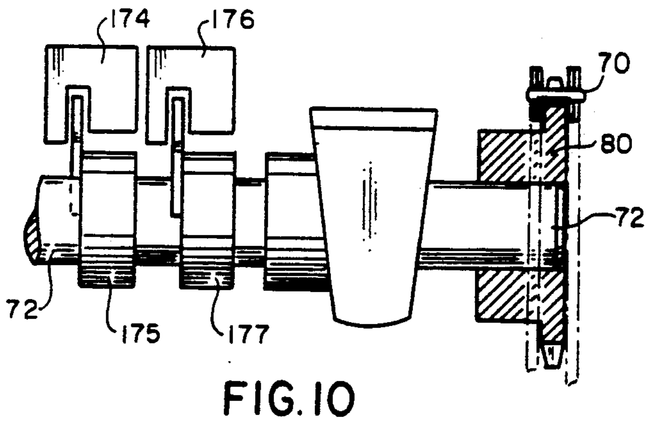
FIG. 10 is an elevational view of a vertical motion drive shaft of the picker assembly showing details of a pair of vanes and Hall effect switches which are actuated by the vanes.
Figure 11:
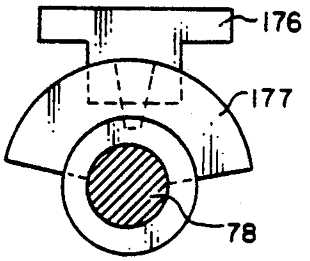
FIG. 11 is a sectional view of a portion of a vanes of the vertical motion drive shaft of the picker assembly.

It may be appreciated that a pair of rotary limit switches 112 and 114 are coupled between the transporter motor 96 and the transporter 86. Similarly, a pair of limit switches 116 and 118 are connected between the motor 111 and the transporter 88 to sense the position of the transporter 88 while it is being driven by the motor 111. Information from the switches 112 and 114 and control of the motors 96 and 111 is carried out by electrical signals carried by a cable 120 connected to the picker 62. The picker 60 includes a hook assembly 122 driven by a solenoid 126. The picker 62 includes a hook assembly 124 driven by a solenoid 128. As may best be seen in FIG. 9, when the transporter 88 is brought into registration with the end of one of the bins 36, which contains, as shown in FIG. 9, two half-gallon packages of ice cream 132 and 134, the hook 124 engages a leaf spring latch 130 to allow the ice cream 134 to be forced forward by a compression spring positioned at the back of the bin 36. As the package 134 is forced onto the normally horizontal wall 104 of the transporter 88, a switch arm 136, connected to a switch 140, is forced downward indicating to the system 10 that the package 134 is properly seated in the transporter 88. A sensing switch 142 also indicates to the system 10 whether or not the bin 36 has been unlatched, allowing the ice cream to be taken. Thus, actuation of switch 142 indicates ice cream taken and switch 140 actuation indicates ice cream properly loaded into the transporter 88. A switch 138, similar to the switch 136, is associated with the transporter 86.

Figure 12:
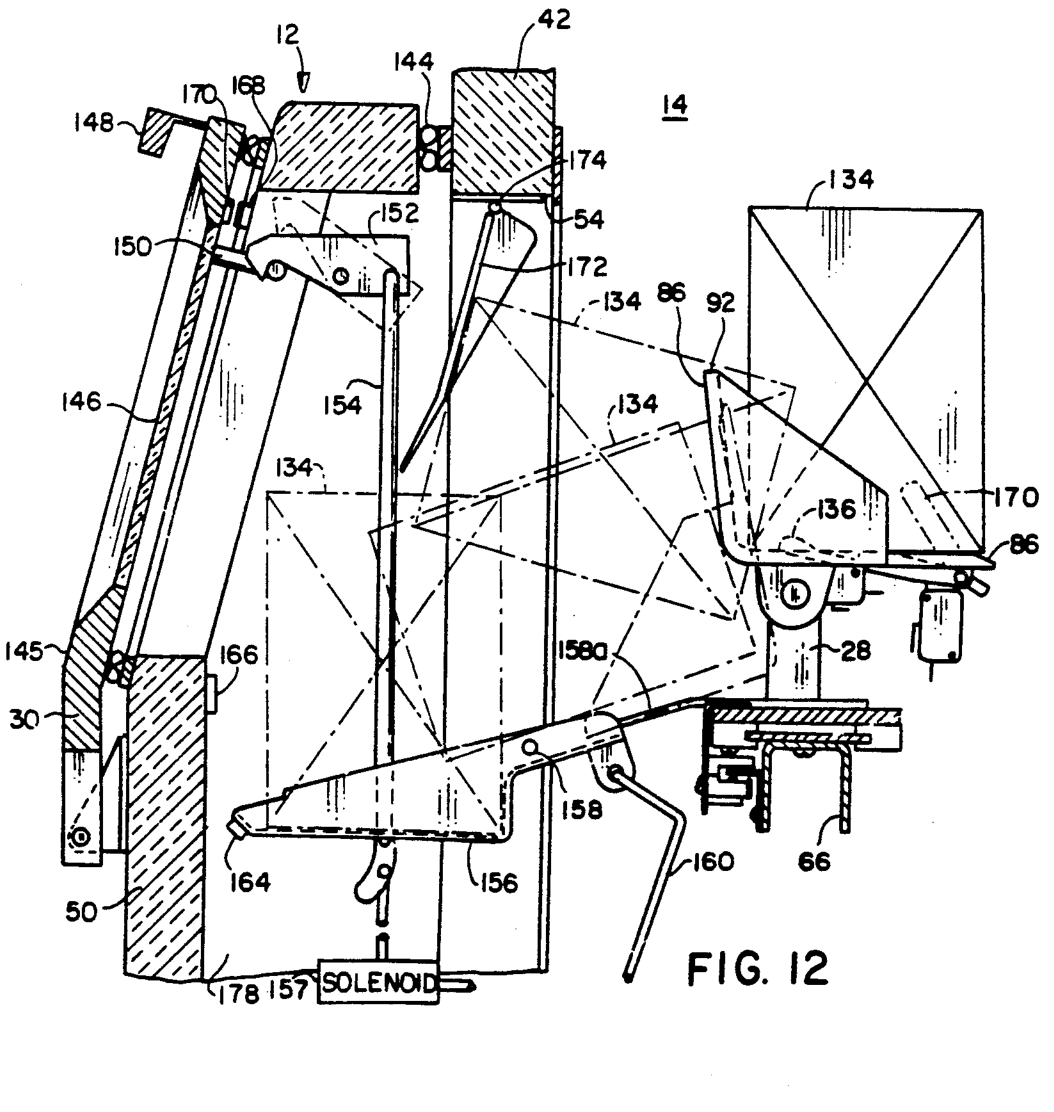
FIG. 12 is a sectional schematic view of the door assembly of the apparatus and the picker assembly showing the details of the transfer of a half-gallon of ice cream from one of the pickers of the picker assembly to the door for delivery to a consumer.
Figure 13:
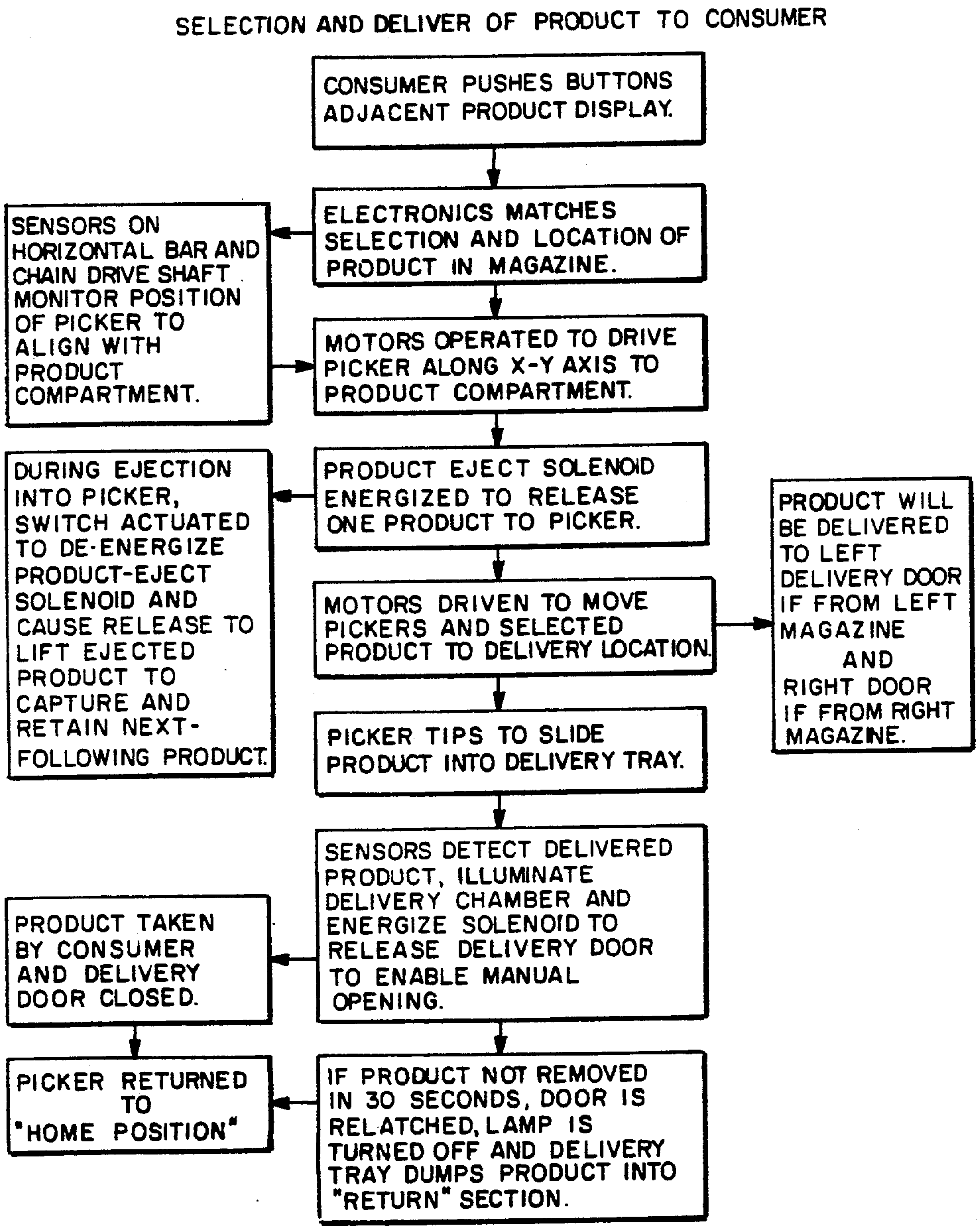
FIG. 13 is a flow diagram of the process of operation of the apparatus whereby a customer selects and receives a particular frozen food product.

Referring now to FIG. 12, it may be seen that when the picker assembly 28 moves into registration with one of the delivery stations 30, it is also in registration with the delivery aperture 54 of the thermal barrier door 42. It should be noted that the area around the aperture 50 is enclosed by a seal 144 attached to the door 40 in order to prevent leakage of heat into the interior 14 of the cabinet 12. The delivery station 30 includes a door 145 having a window section 146 and has a handle 148 connected thereto. It should be noted that the delivery door 145 has a latching pin 150 connected thereto which is engaged by a rotatable latch 152 connected to a link 154. Inadvertent opening of the delivery door 145 is prevented by the rotatable latch 152, which remains engaged with the pin 150 until a solenoid 157 is actuated by the system 10, drawing the link 154 downward and releasing the latch 152. This is not done until product 134 is in position to be delivered. It may be seen in FIG. 12 that the ice cream carton 134 carried on the transporter 86 is brought into registration with a dispenser tray 156 mounted on a pivot pin 158. As the product 134 slides into the dispenser tray 156, the dispenser tray 156 is held in a substantially level position by the weight of the product 134 acting against a stop 158*a* adjacent the dispenser tray 156. At the point that the product 134 is indicated as having left the transporter 86,. by the switch arm 136 and a front transporter switch arm 170 having been raised, the system actuates the solenoid 157 to release the door 145. The door 145 remains released for 30 seconds allowing a consumer to open the door 145 and remove the ice cream package 134 from the interior of the freezer. In the event that the package is removed, the dispenser tray 156 pivots so that a magnet 164 on the end of the dispenser tray 156 is brought into juxtaposition with a Hall effect sensor 166 on the door 145, thereby signalling to the system 10 that the ice cream 134 has been taken. A signal is also sent to the system 10 that the door 145 has been opened by a delivery door sensor 168 positioned on the outer door 50 adjacent a magnet 170 positioned on the delivery door 145. It should also be appreciated that a flap 172 is attached via a hinge 174 to the portion of the door 40 defining the aperture 54 so that the flap 172 remains oriented substantially downward by partially sealing the aperture 54 to prevent the entry of warm air into the interior 14. When the dispenser tray 156 does not have an ice cream container 134 thereon, the dispenser tray 156 pivots so that the magnet 164 swings up into proximity with the flap 172 thereby allowing the flap 172 and the dispenser tray 156 to substantially close the dispensing aperture 54 in the inner door 40. If the ice cream package 134 is not taken from the dispenser tray 156, the dispenser tray 156 is released by moving the picker bar 66 upward to allow the dispenser tray 156 to swing downward and allowing the package 134 to slide down a chute 178 having a ramp 180 therein so that the ice cream 134 is returned through a return aperture 182 to the interior 14 of the cabinet 12 where it may be stored without any deterioration. Similarly, persons wishing to return ice cream may open a return door 184, next to the delivery door 145, and deposit the ice cream in a similar chute where it is returned to a holding area at the bottom of the interior 14 of the cabinet 12.

Figure 19:
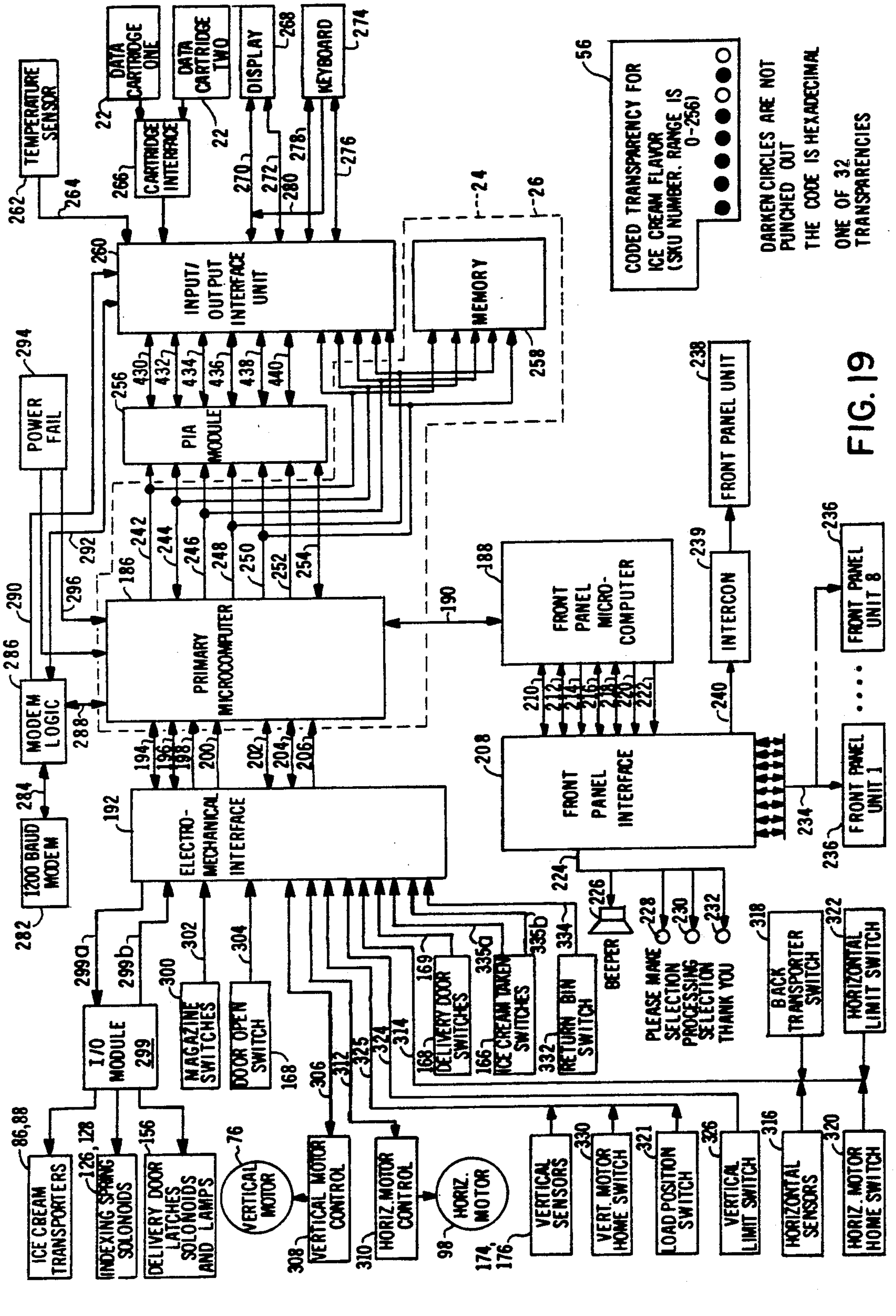
FIG. 19 is a block diagram of the electronic circuitry of the apparatus of FIG. 1.

As may best be seen in FIG. 19, a controller comprising a primary microcomputer control 186 and a front panel microcomputer 188, connected together via a bus 190, are shown therein. The primary microcomputer 186 is a Wintek 6809 multiboard microcomputer. The front panel microcomputer is a Wintek 6809 central processing unit assembly connected via bus 190 to the primary microcomputer 186. The microcomputer 186 is connected to an electromechanical interface unit 192 via a port 2 PA(0:6) bus 194, a port 2 PB(0:7) bus, a port 2 CA1 bus 200, a port 2 CA2 bus 202, a port 1 PA(0:7) bus 204, a port 1 PB(0:7) bus 204 and a port 1 CA1 bus 206. A front panel interface unit 208 is connected to front panel microcomputer 188 by a port 1 PA(0:7) bus 210, a port 1 PB(0:7) bus 212, a port 1 CA2 bus 24, a port 2 PA(0:7) bus 216, a port 2 PB(0:7) bus 218, a port 2 CB bus 220 and a RESET/E bus 222. The interface unit 208 is connected via a signalling bus 224 to a beeper 226, a please-make-selection lamp 228, a processing-selection lamp 230, and a thank-you lamp 232, all of which are located on outer door 52. A front panel selection bus 234 is connected to 8 front panel boards 236, each of which has two product selection switches 18 connected to it as well as two food product code sensors 20 connected to it. Each of the boards 236 is mounted inside of outer door 50. Similarly, a plurality of boards 238 are connected via a bus 240 to the interface unit 208. The boards 238 are connected to the product selection switches 18 in the outer door 52. The microcomputer 186 is connected via an address 242, an 8-bits data bus 244, an R/W bus 246, an E bus 248, an IOSEL bus 250, a reset bus 252 and a FIRQ bus 254 to a Wintek programmable interface module 256. Buses 242 through 254 are likewise connected to a memory board 258 and to an input/output interface board 260 as well. The input/output interface board 260 has a temperature sensor 262 connected to it via a bus 264. A cartridge interface unit 266 is connected by a bus 268 to the general interface unit 260. The data cartridges 22 may be connected to the cartridge interface unit 266 to transfer information thereto. A dot matrix display 268 is connected via a bus 270 and a bus 272 to the interface 260. The display 268 is positioned on the interior of the inner door 42 for displaying diagnostic information and like to an operator of the unit 10. A membrane keyboard 274 is positioned on the inner door 42 adjacent the display 268. The keyboard is coupled via a PA7 bus 276, a CA1 bus 278, and a PB(0:3) bus 280 to the interface unit 260 to supply keyboard information thereto. The microcomputer 186 also may communicate with remote systems via a modem 282 connected via a modem bus 284 to modem interface logic 286. The modem interface logic 286 is connected via a bus 288 to the microcomputer 186 and is also connected via a bus 290 and a bus 292 to the interface unit 260. A power fail indicator unit 294, which signals power fail conditions to allow the system 10 to degrade gracefully, is connected via a bus 296 to the microcomputer 186.

The interface 192 has connected thereto a plurality of magazine switches 300 which indicate the presence or absence of magazines 32 and 34 in the interior 14 of the cabinet 12. The magazine switches 300 are connected via a bus 302 to the interface unit 192. The door open switch 168 is connected via a bus 304 to the interface unit 192 for communication with the microcomputer 186. A bus 306, connected to the interface unit 192, communicates with an Automotion LC4B vertical motor control unit 308 which is connected to the vertical motor 76 of the picker assembly 28.

A horizontal motor controller 310 is connected a horizontal motor control bus 312 to the interface 192 and controls the horizontal motor 98. A horizontal sensor bus 314 is connected to horizontal position sensors 316 on the picker assembly 28, a back transporter switch 318, a horizontal motor home switch 320 and a horizontal limit switch 322 to provide information through the interface unit 192 to the microcomputer 186 as to the current position of the pickers 60 and 62 on the horizontal track bar 66. In a similar fashion, a bus 324 connects a vertical limit switch 326 to the interface 192, while a bus 326 connects a load position switch 328, a vertical motor home switch 330 and the vertical sensors 174 and 176 to the interface board 192. Finally, a return bin switch 332 is connected via a bus 334 to the interface 192 for communication therewith.

It may be appreciated that the front panel microcomputer interface unit 208 is disclosed in FIGS. 20, 21, 22, 23, 24, 25, 26 and 27. The electromechanical interface unit 192 is shown in FIGS. 28, 29, 30, 31, 32, 33 and 34. The input/output interface unit 260 is disclosed in FIGS. 35, 36, 37, 38 and 39. Since each of the front panel boards 236 and 238 is substantially identical, an exemplary front panel unit is disclosed in FIG. 40.

Figure 35:
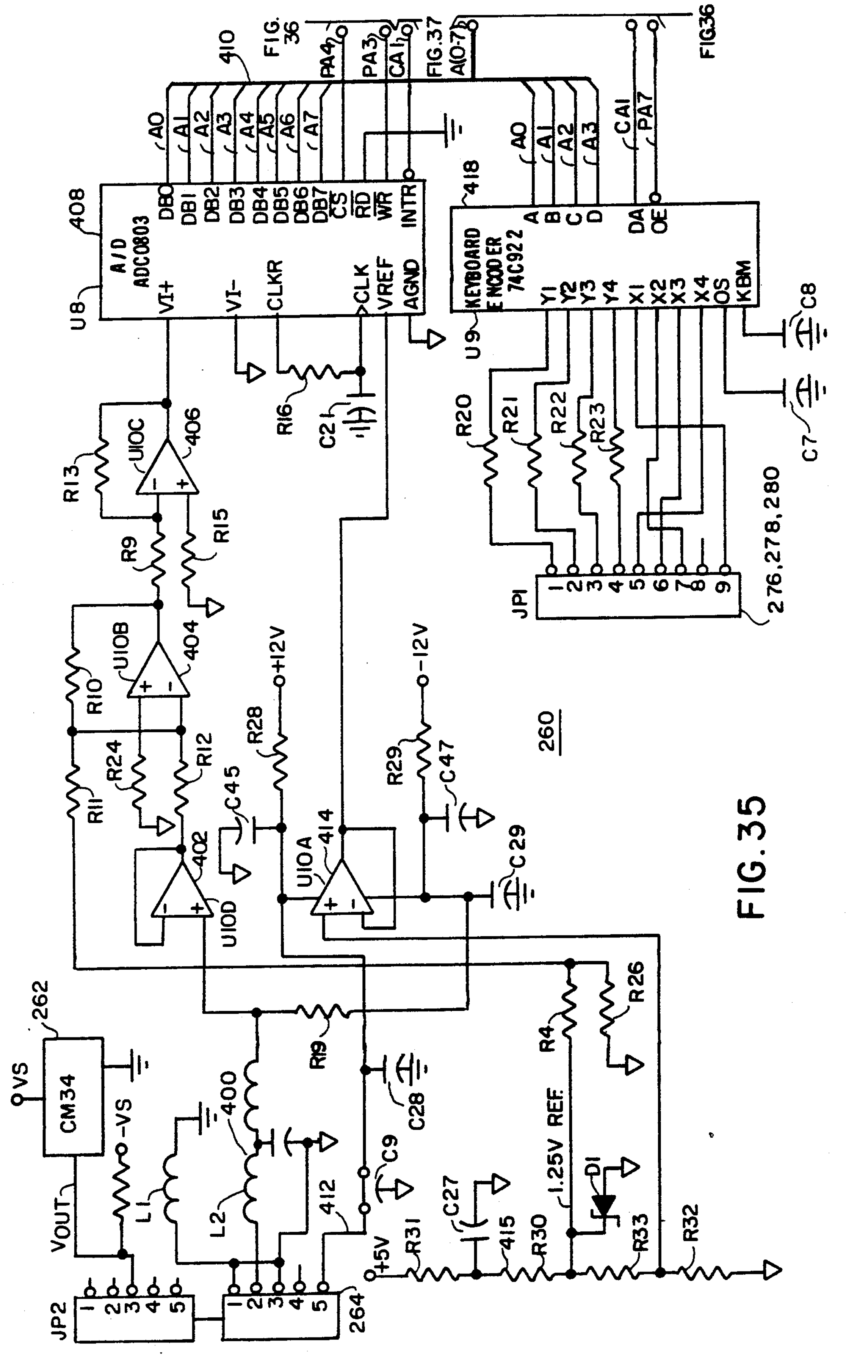
FIGS. 35-39 are schematic diagrams of an input/output interface unit.
Figure 36:
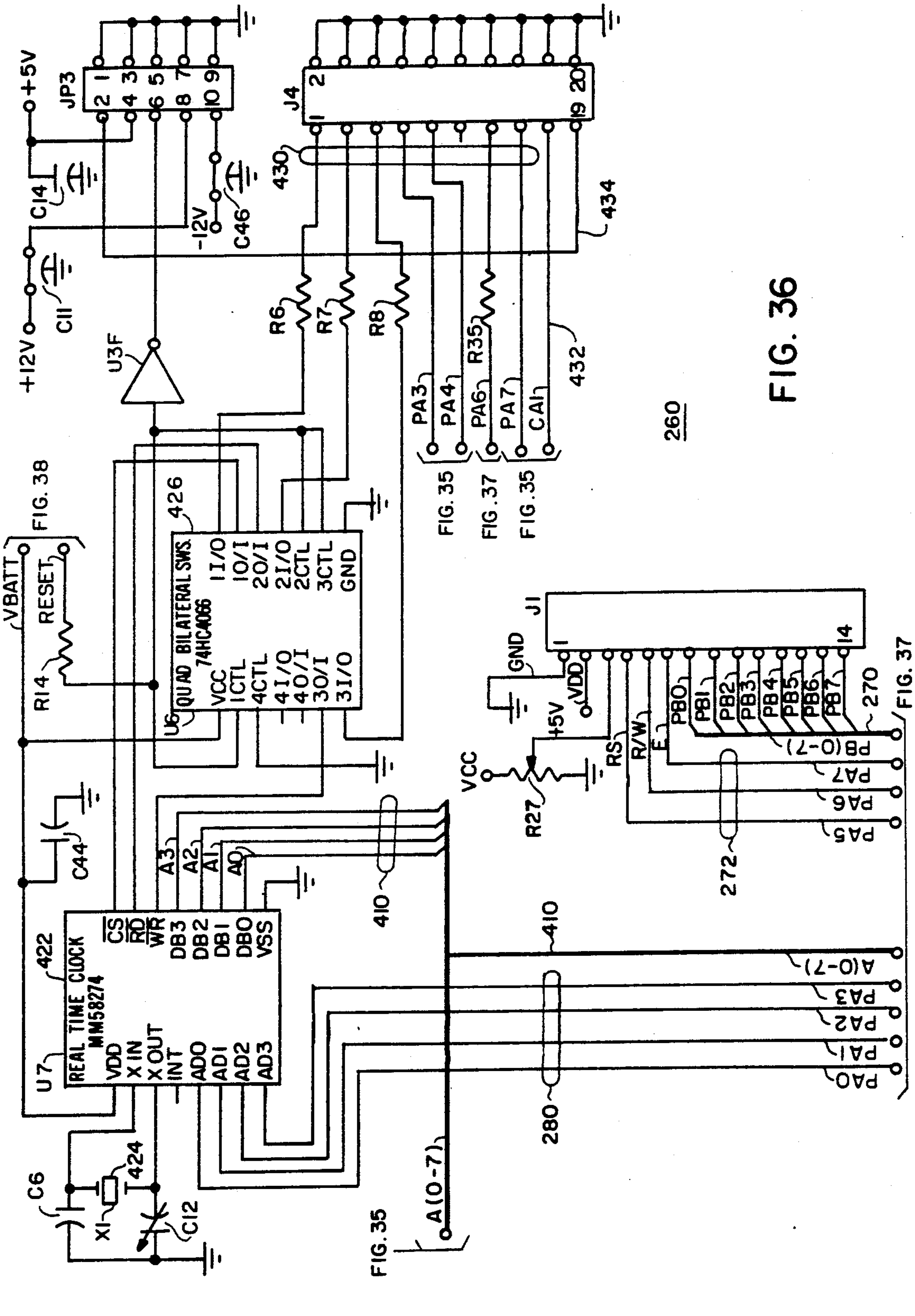

As may best be seen in FIG. 35, a temperature sensor 262, connected through bus 264, feeds a low pass filter 400 to produce a low passed filtered signal. The low pass filtered signal is fed to a voltage follower 402 which buffers the signal and feeds it to an inverting amplifier 404. The amplified signal from the inverting amplifier 404 is sent to a second inverting amplifier 406 which feeds the signal to an ADC0804 analog-to-digital converter 408 from which an 8-bit output, at lines A0 through A7, is generated on a bus 410. Also required to drive the analog-to-digital converter 408 is a voltage reference signal which comprises a 12 volt potential received on a line 412. A regulated voltage divider 415, consisting of a plurality of resistors and a Zener diode supplies reference voltages both to the amplifier 404 and to an amplifier 414 connected to the lead 412. The amplifier 414 drives the voltage reference terminal of the analog-to-digital converter 408. The buses 276, 278 and 280 are connected via a connector block JPI to the keyboard encoder 418. The keyboard encoder 418 receives signals from the keyboard 274 on the inside of the inner door 42 for control of microcomputer 186 operations in accordance with the software listed hereinafter. The interface board 260 also includes a real time clock 422 comprised of an MM58274 integrated circuit driven from a crystal oscillator 424. Clock signals are supplied to a CD4066 quad bilateral switch integrated circuit 426. The programmable interface adapter 256 is connected to the input/output interface unit 260 by a bus 430, a bus 432, a bus 434, a bus 436, a bus 438 and a bus 440. The quad bilateral switches 426 selectively connect resistor R6 to the chip select terminal on the real time clock 422, resistor R7 to the read terminal on the real time clock 422, and resistor R8 to the write terminal on the real time clock 422 in order to reload the contents of the real time clock 422 under the control of the microprocessor 186. The contents of the real time clock 422 may be accessed via the bus 280 connected to it, and information may be fed to it by the bus 410.

Figure 37:
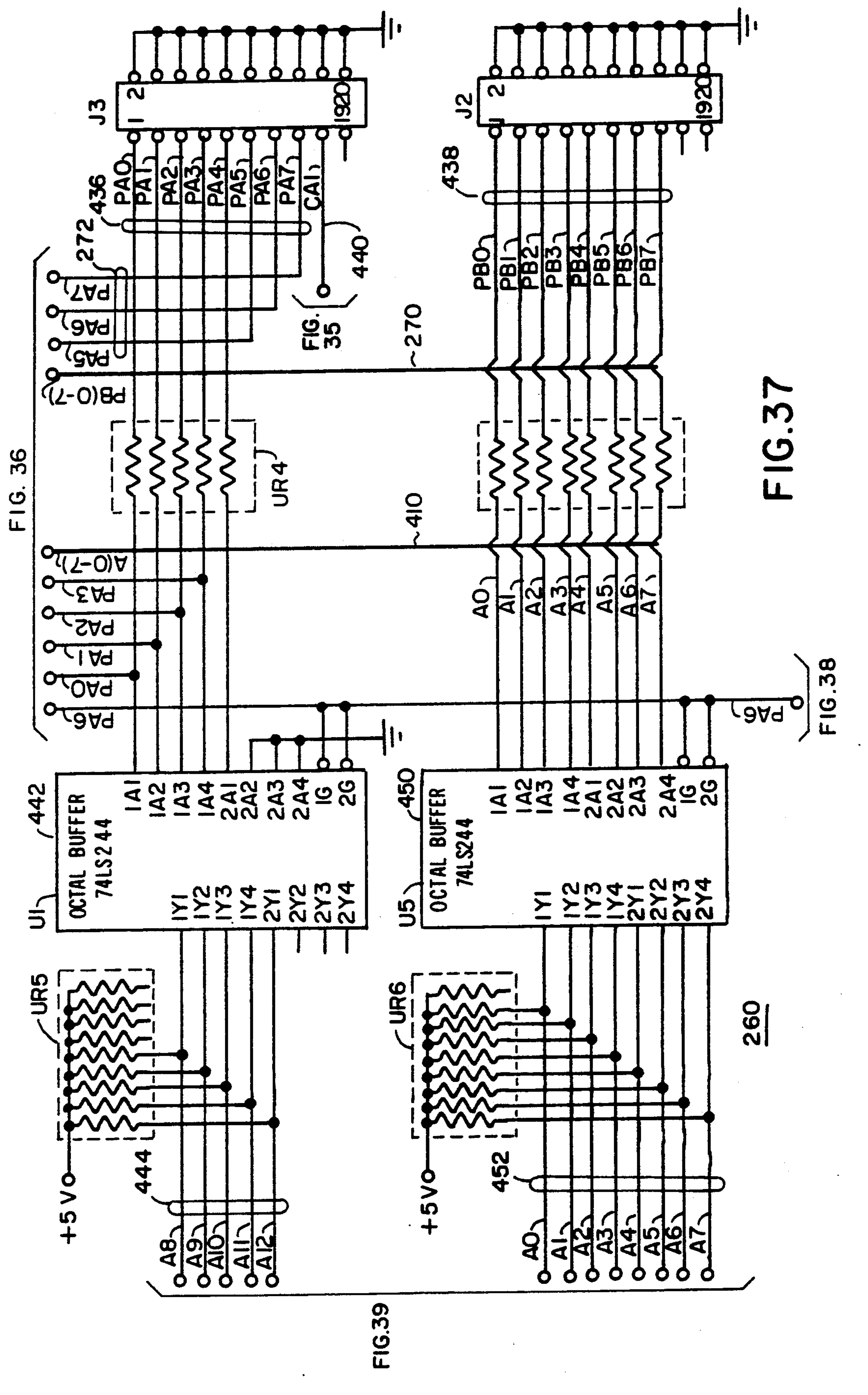

Referring now to FIG. 37, FIG. 37 shows a port A interface bus 436, a port B interface bus 438, and CA1 bus 440. Bits 4 through 0 of the bus 436 are fed to an octal buffer 442 and output on a bus 444. Similarly, a 74LS244 octal buffer 450 receives eight bits from either bus 410, bus 270 or bus 438, whichever one is driven high, and outputs the bits on a bus 452.

Figure 38:
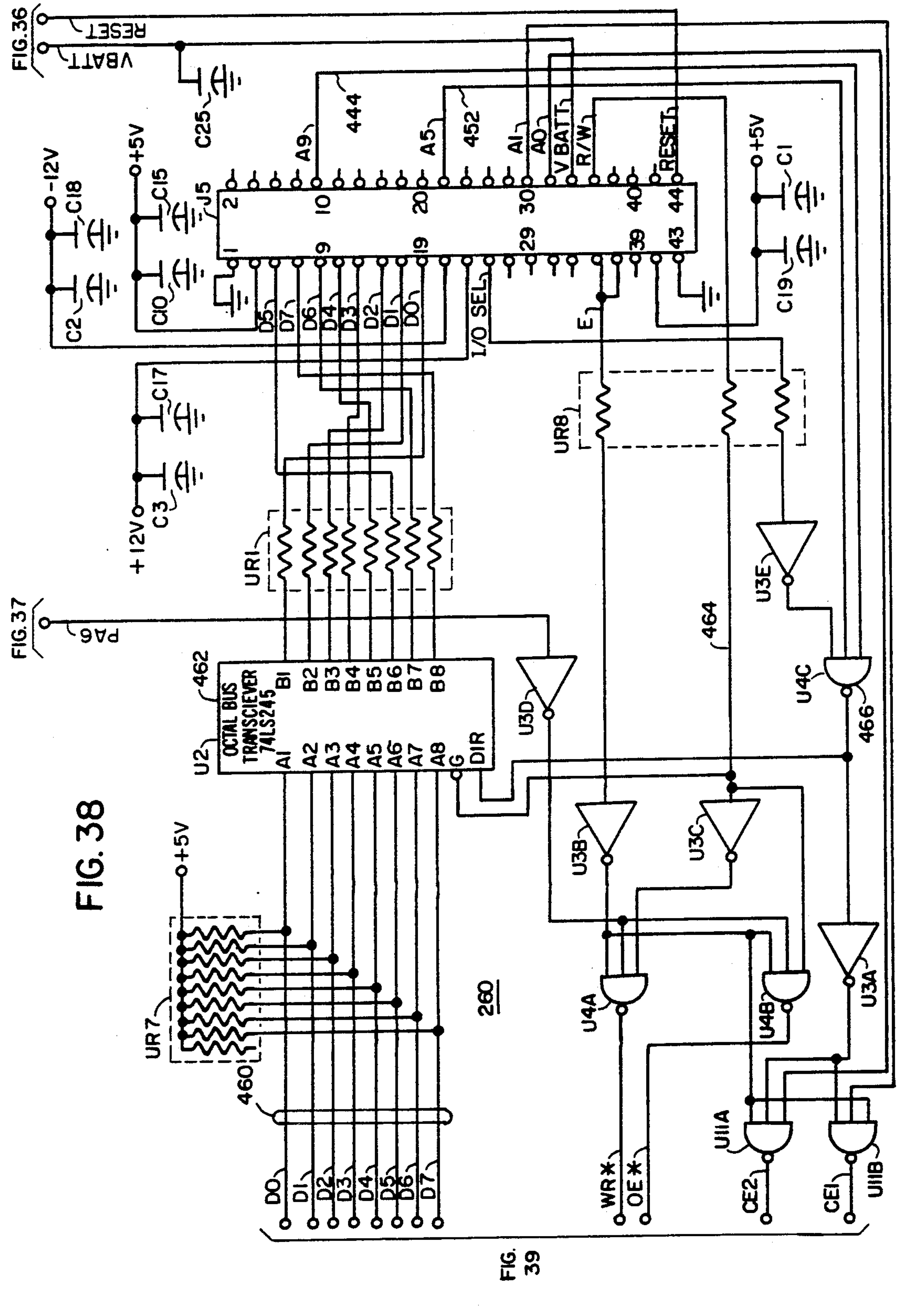
Figure 39:
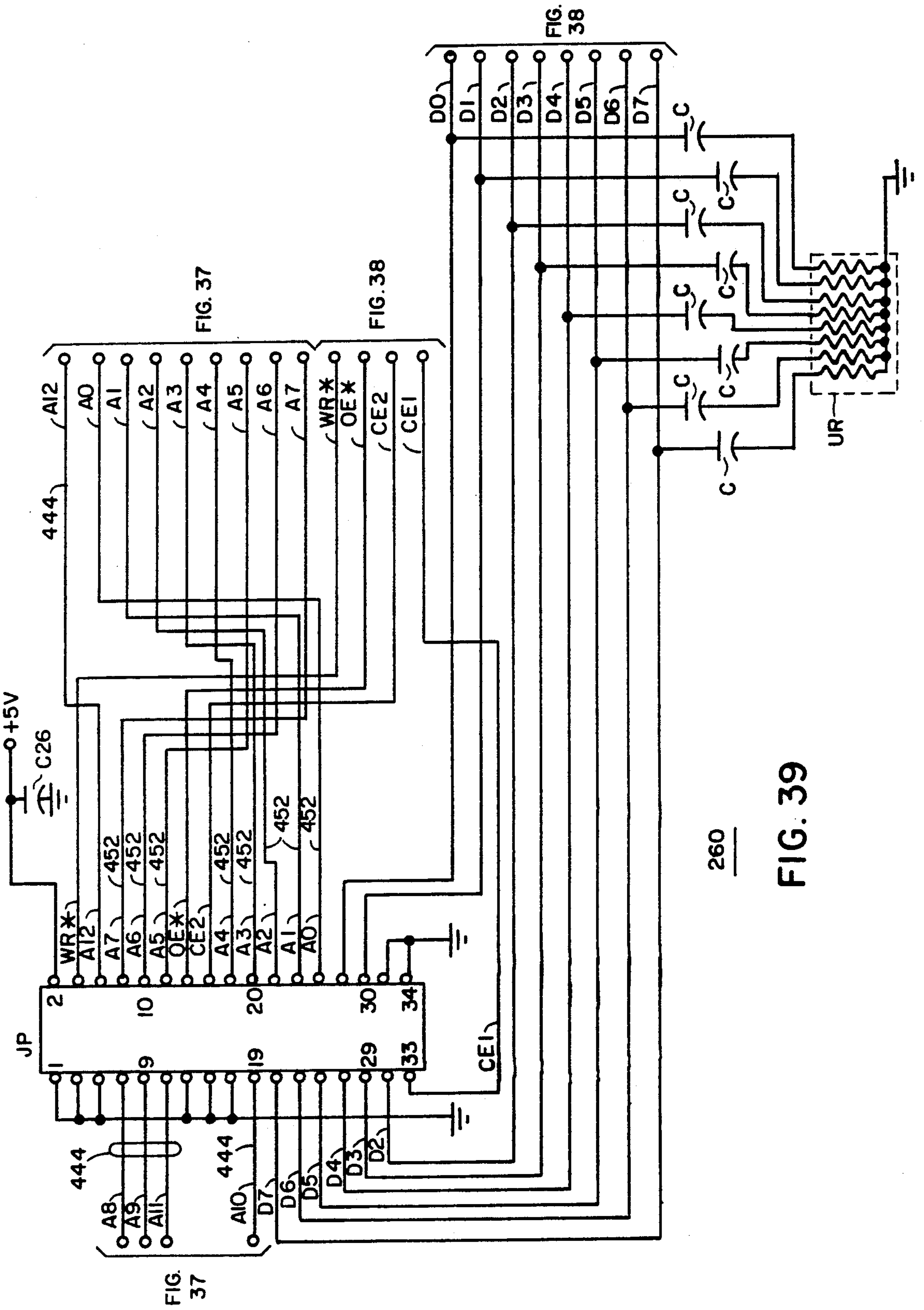

Referring now to FIG. 38, a data bus 460 feeds a 74LS245 octal bus transceiver 462, operating under control from a read/write line 464 or from a NAND gate 466, driven from the address bus 444 and the bus 452. The octal bus transceiver 462 controls the flow of information to and from the data cartridges 22 so that the data cartridges 22 can be interrogated through the octal bus transceiver 462.

Referring now to the electromechanical interface unit 192, which is also coupled to the microcomputer 186, the interface unit 192 mediates signals between the microcomputer 186 and the handling means 28, various door switches and the like. Thus, the electromechanical interface unit 192 controls signal flow related to sensing of the ice cream handling equipment condition, as well as driving of the ice cream handling equipment and the delivery stations.

Figure 28:
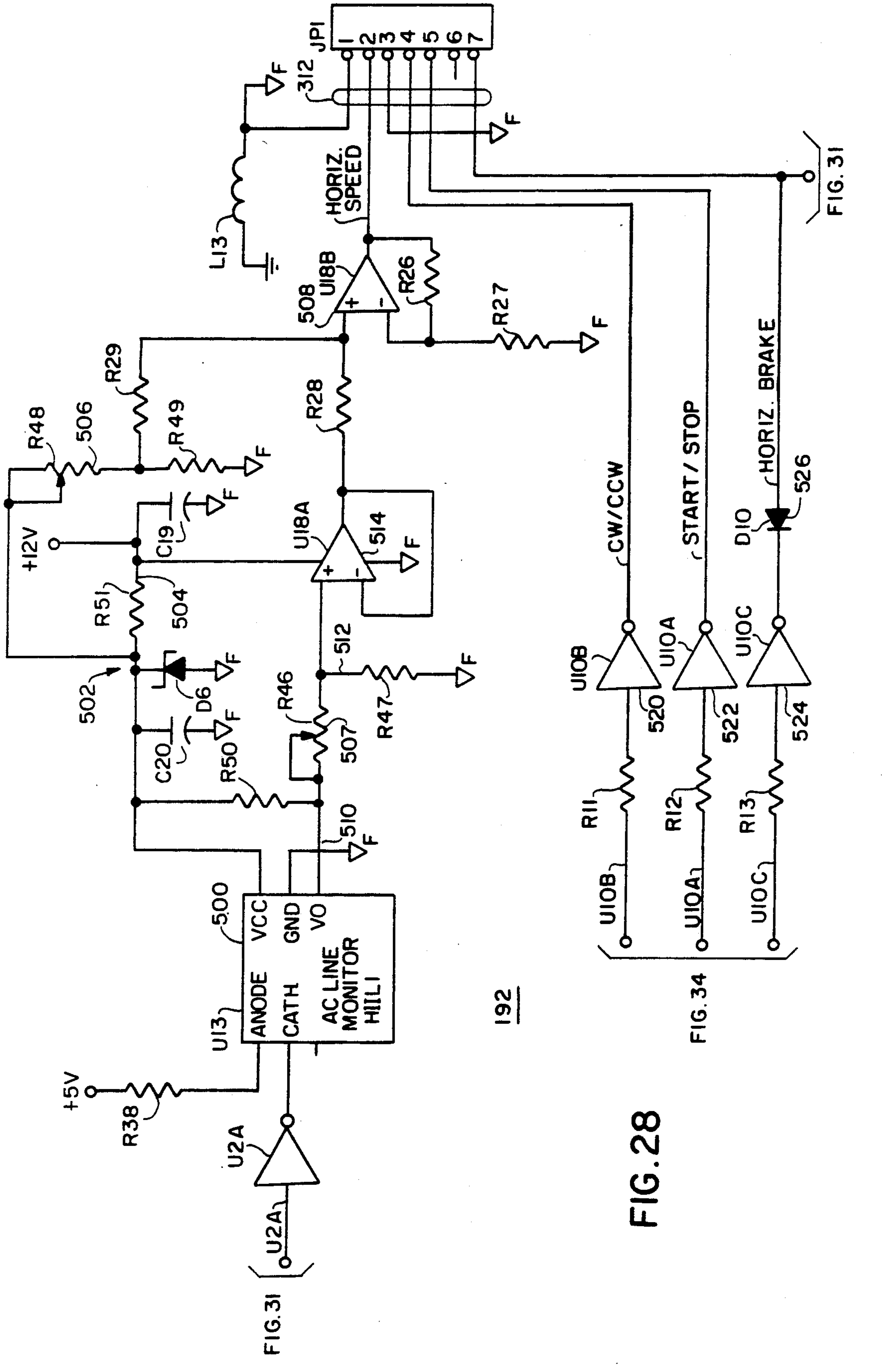
FIGS. 28-34 are schematic diagrams of an electromechanical interface unit.
Figure 29:
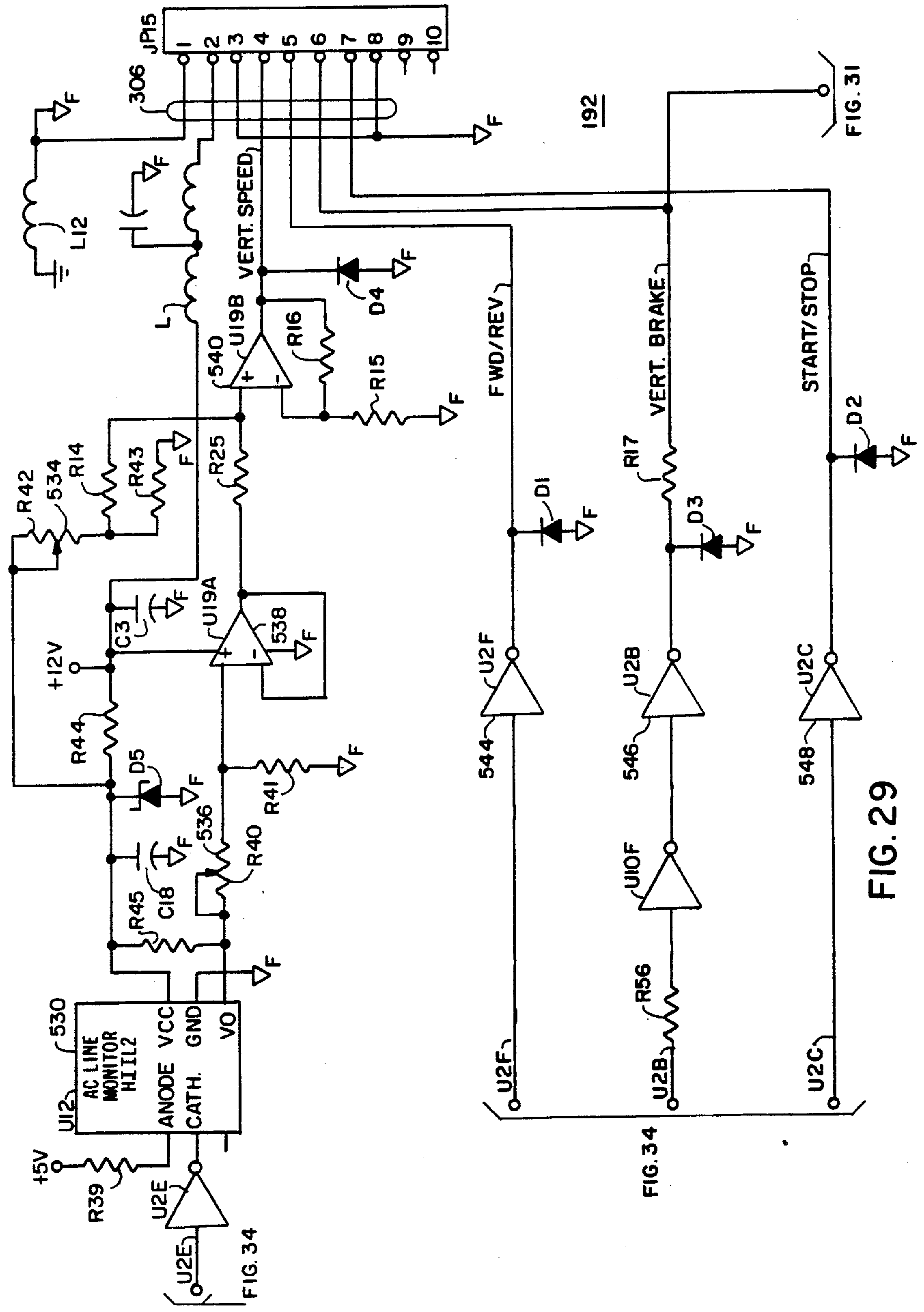

Referring now to FIG. 28, the portion of the interface unit 192 related to the horizontal motor controller 310 is shown therein. An AC line monitor 500, which is actually an opto-isolator, is connected to a voltage generating network 502 including a potentiometer 506 and a potentiometer 507 feeding a buffer amplifier 514. The buffer amplifier 514 and the resistor 506 feed a differential amplifier 508 which generates a horizontal speed signal supplied via the bus 312 to the horizontal motor controller 310. An inverter 520 selects clockwise or counterclockwise motor rotation. An inverter 522 sets the start and stop condition, while an inverter 524 connected to a diode 526 sets the horizontal brake. Referring now to FIG. 29, a similar vertical speed control unit is shown therein with an AC line monitor 530 connected to a voltage generating network 532 including a variable resistor 534 and a potentiometer 536 feeding a buffer amplifier 538. The buffer amplifier 538 and a resistor 534 feed a differential amplifier 540 which generates a vertical speed signal supplied via the bus 306 to the vertical motor controller 308. An inverter 544 selects forward or reverse, that is up or down directions, for the vertical motor 76. An inverter 546 causes the vertical brake to engage or disengage, and an inverter 548 generates start/stop commands. Inverters 544, 546 and 548 all feed signals to the bus 306.

Figure 30:
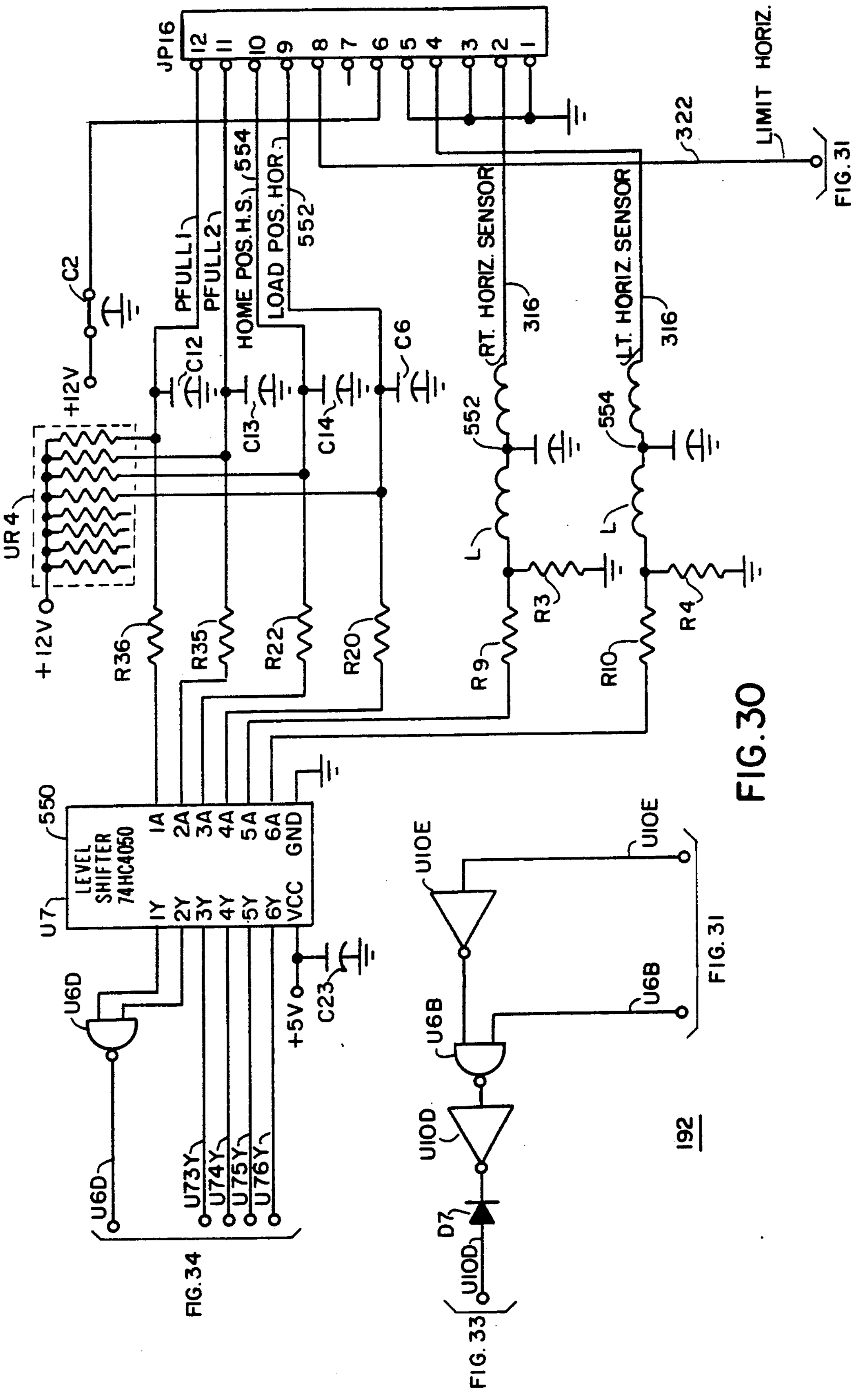

As may best be seen in FIG. 30, a sensing subunit for sensing the horizontal position, among other things, of the pickers 60 and 62 on the picker bar 66 is shown therein. The position sensing bus 316 receives signals related to the left horizontal Hall effect sensor and the right horizontal Hall effect sensor, and feeds those signals to a level shifter 550 from which they are output. Likewise, signals related to the actuation of the load position, horizontal sensor, and the home position horizontal sensor fed on line 554, are fed to the level shifter 550. The right horizontal position signal and the left horizontal position signal are respectively filtered by low pass filters 552 and 554 before being fed to the level shifter.

Figures 28, 29, 30, 31, 34:
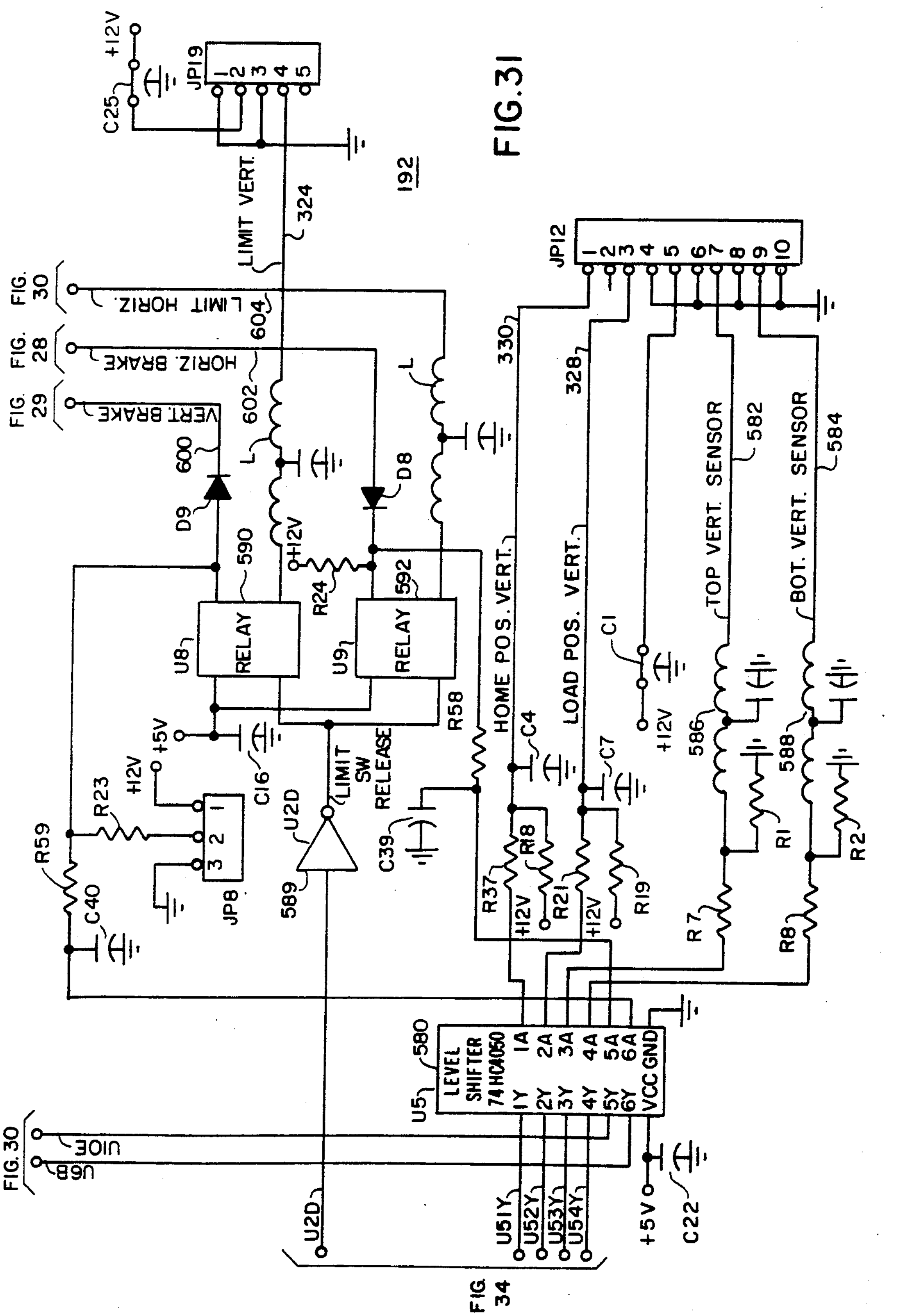

Referring now to FIG. 31, a level shifter 580 is connected to receive filtered signals from the top vertical sensor 174 along a line 582, the bottom vertical sensor 176 along a line 584, home position vertical sensor on the line 330, and the load position vertical sensor on the line 328. The signals on lines 582 and 584 are filtered by low pass filters 586 and 588, respectively, to remove noise. An inverter 589 is connected to a pair of relays 590 and 592 which are connected to a vertical brake line 600, horizontal brake line 602, and a limit horizontal line 604. In the event that a limit switch release signal is given, the relays 590 and 592 are deactivated, causing the vertical brake, horizontal brake signals to be deactivated and allowing the handling means 28 to exceed its normal travel limits. This will allow the picker bar 66 to be moved out of the way if it is necessary to perform maintenance on the interior 14 of the system 10.

Figure 32:
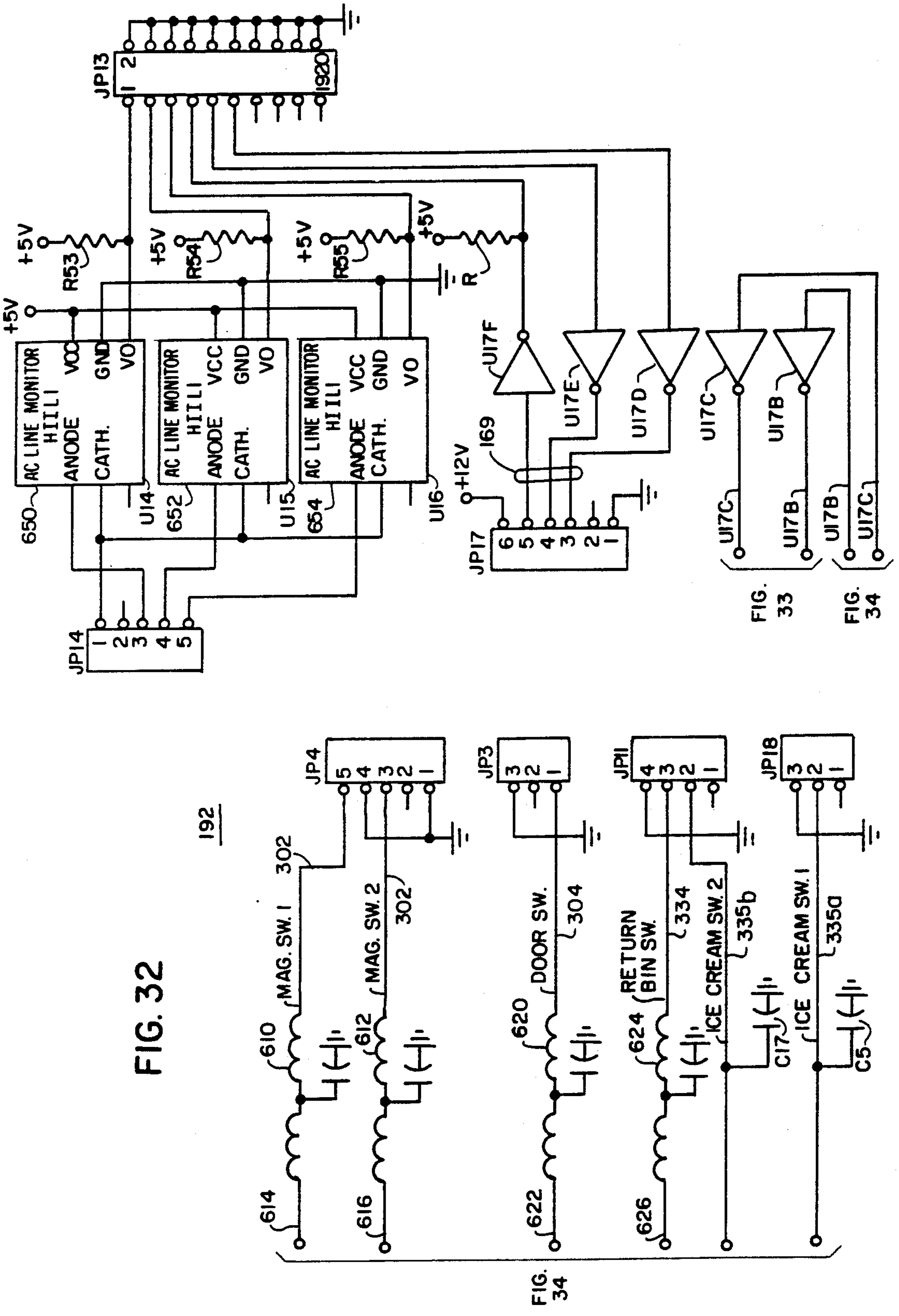

Referring now to FIG. 32, the magazine lines 302 feed magazine switch signals to a pair of low pass filters 610 and 612, which drive lines 614 and 616. The door switch signal line 304 drives a low pass filter 620 which drives the line 622. The return bin switch signal drives a low pass filter 624, which drives a line 626. The ice cream switch line 335A and the ice cream switch line 335B all feed a level shifter 630 on FIG. 34.

Figure 33:
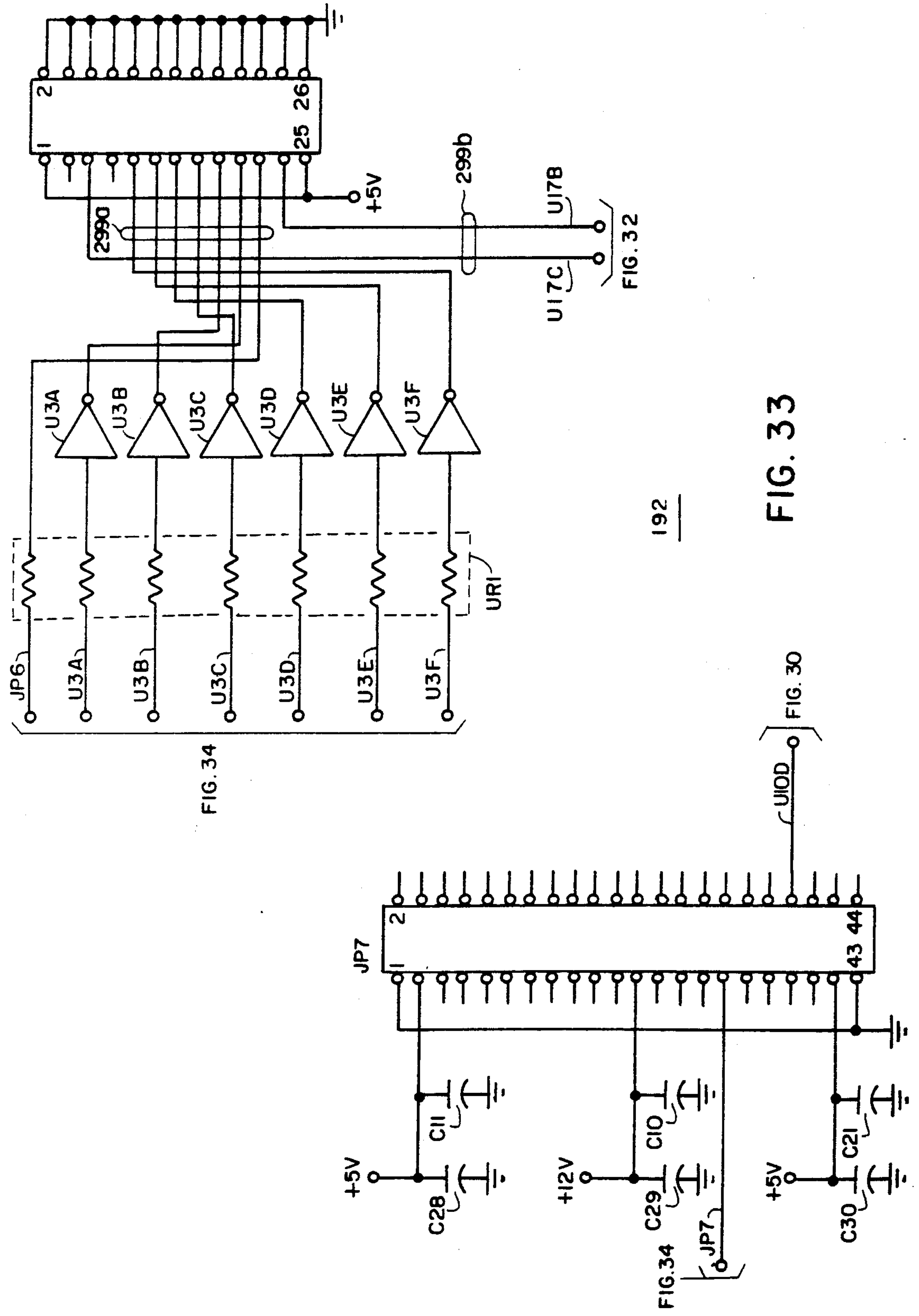
Figures 28, 29, 30, 31, 32, 33, 34:
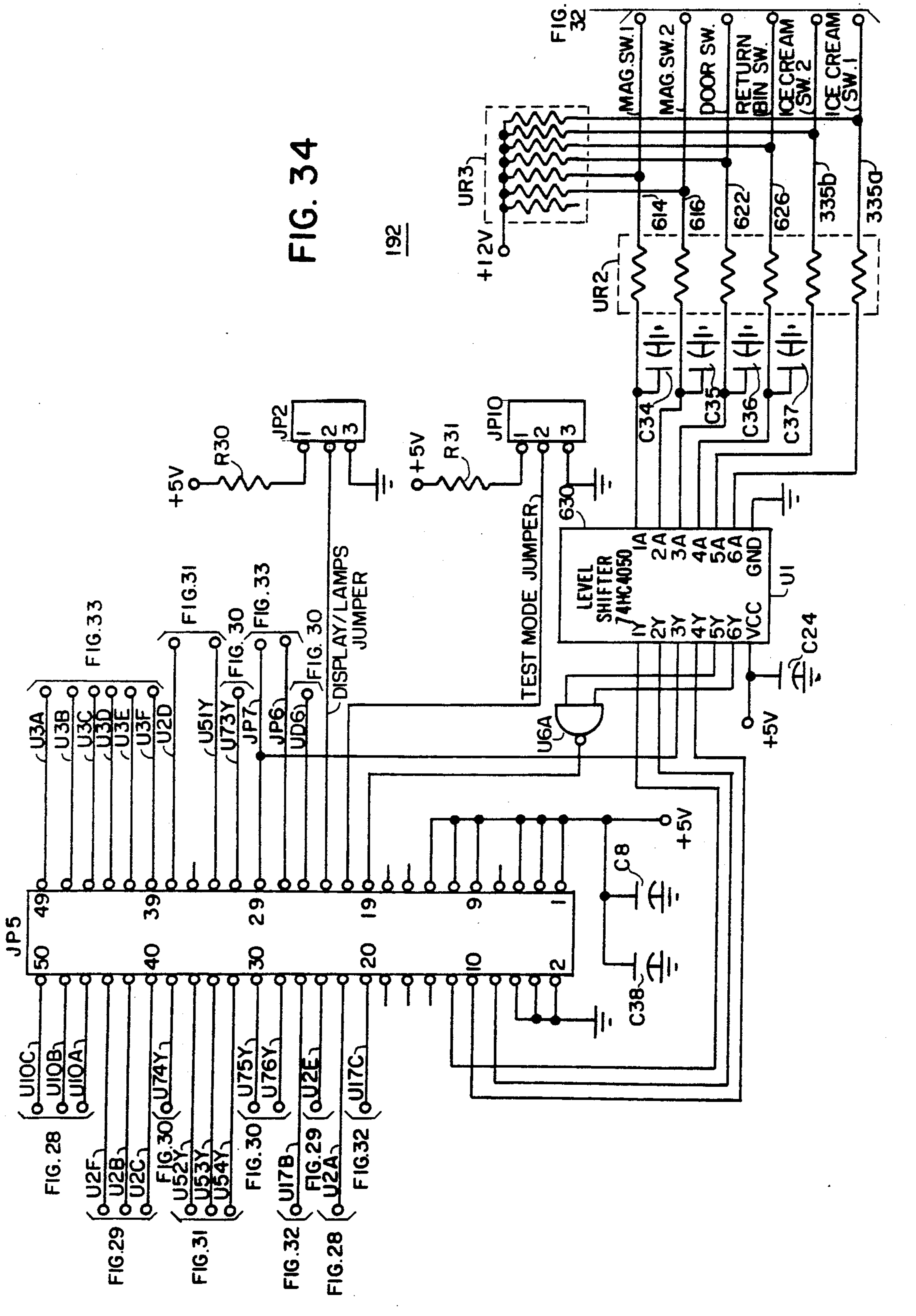

As to FIGS. 33 and 34, a plurality of line drivers extending from a connector shown on FIG. 34 drive a bus 299A connected to the I/O module board for enabling a plurality of relays on the I/O module board for driving the ice cream transporters 86 and 88, the indexing spring solenoids 126 and 128, and the delivery door latches, solenoids and lamps as exemplified by delivery door latch 156. FIG. 34 shows a connector portion of the board which includes buses 194, 196, 198, 200, 202, 204 and 206, coupling the microcomputer 186 and the interface unit 192.

Figure 20:
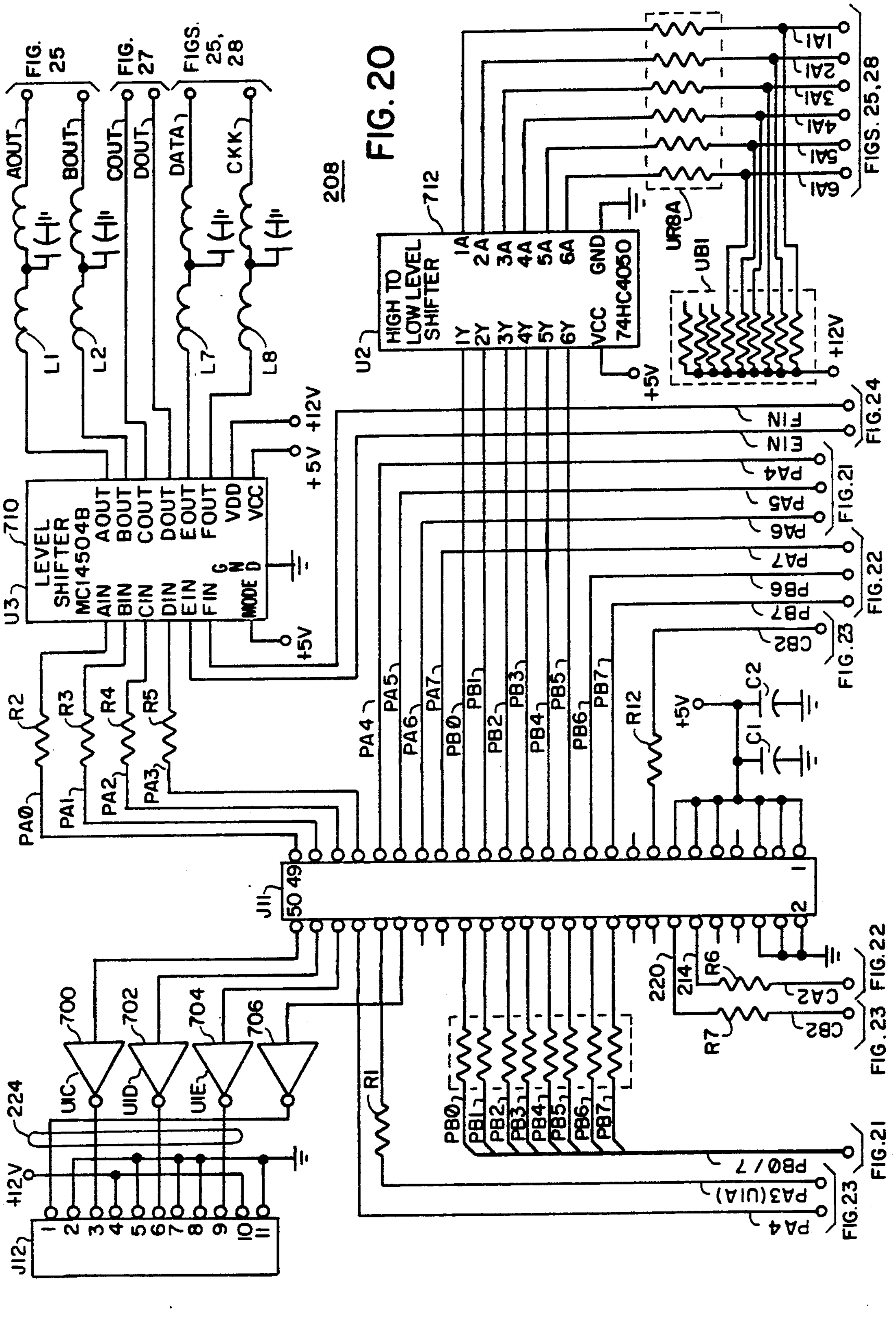
FIGS. 20-27 are schematic diagrams of a front panel interface unit.
Figure 21:
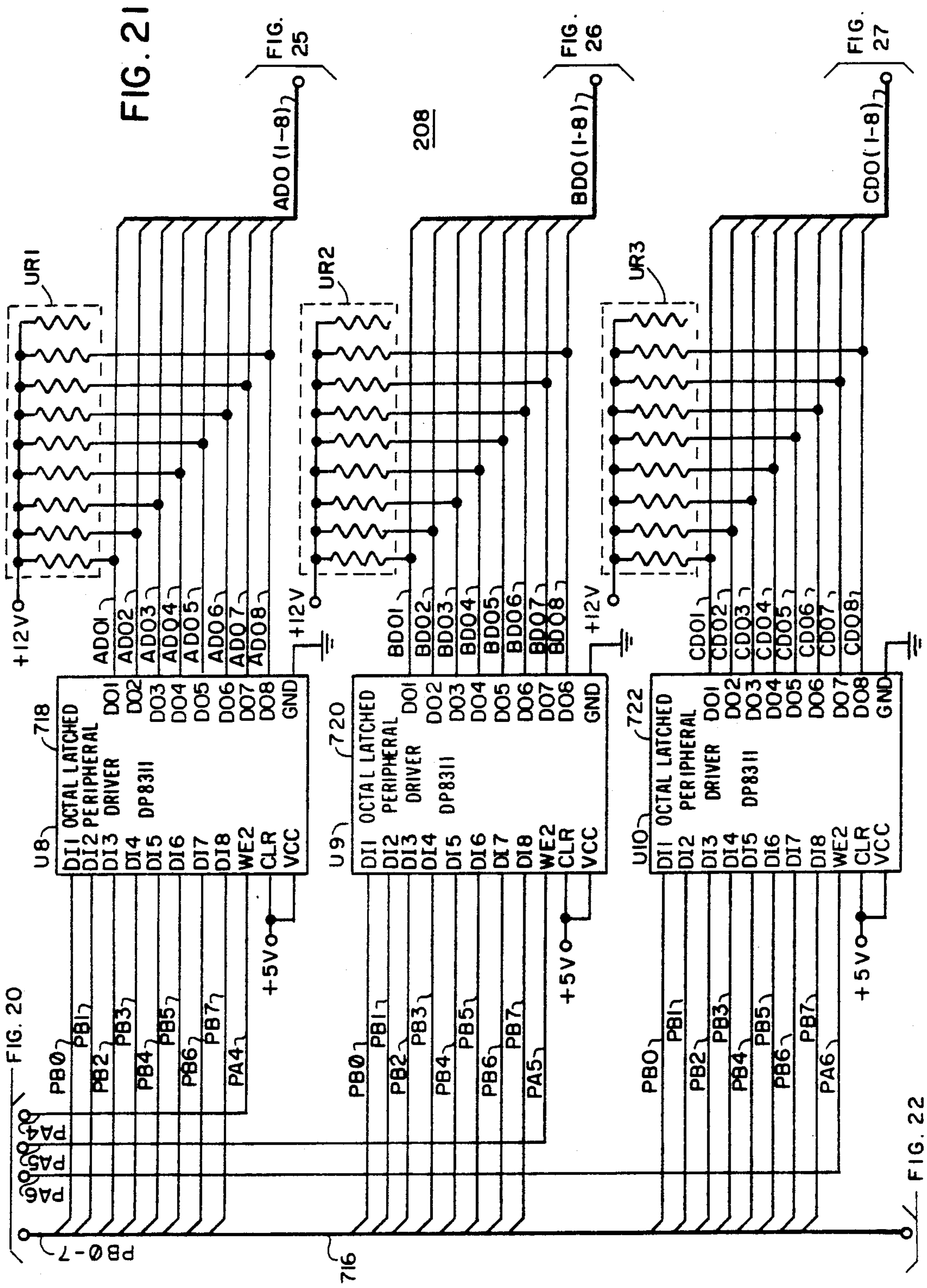
Figure 22:
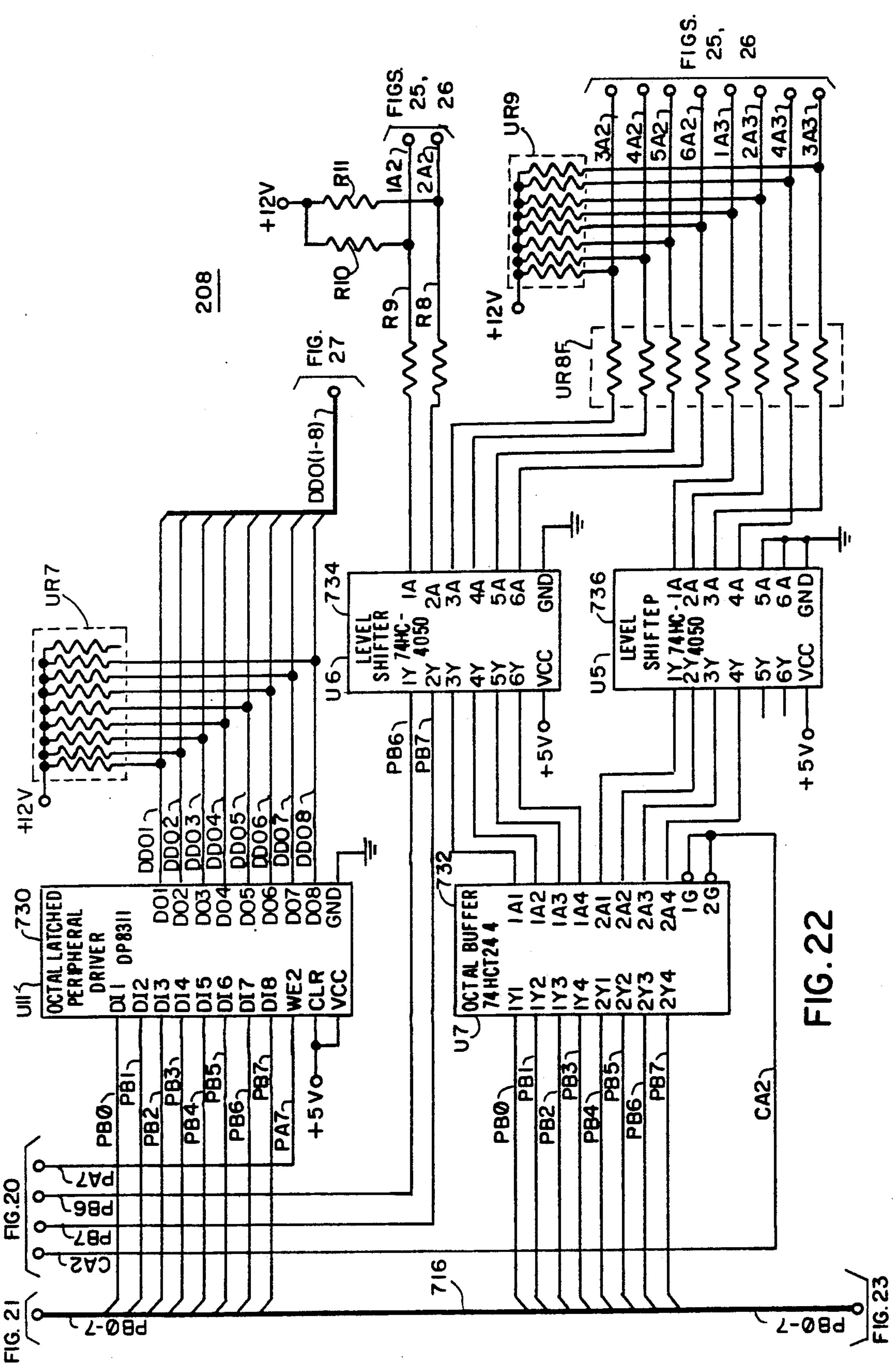
Figure 23:
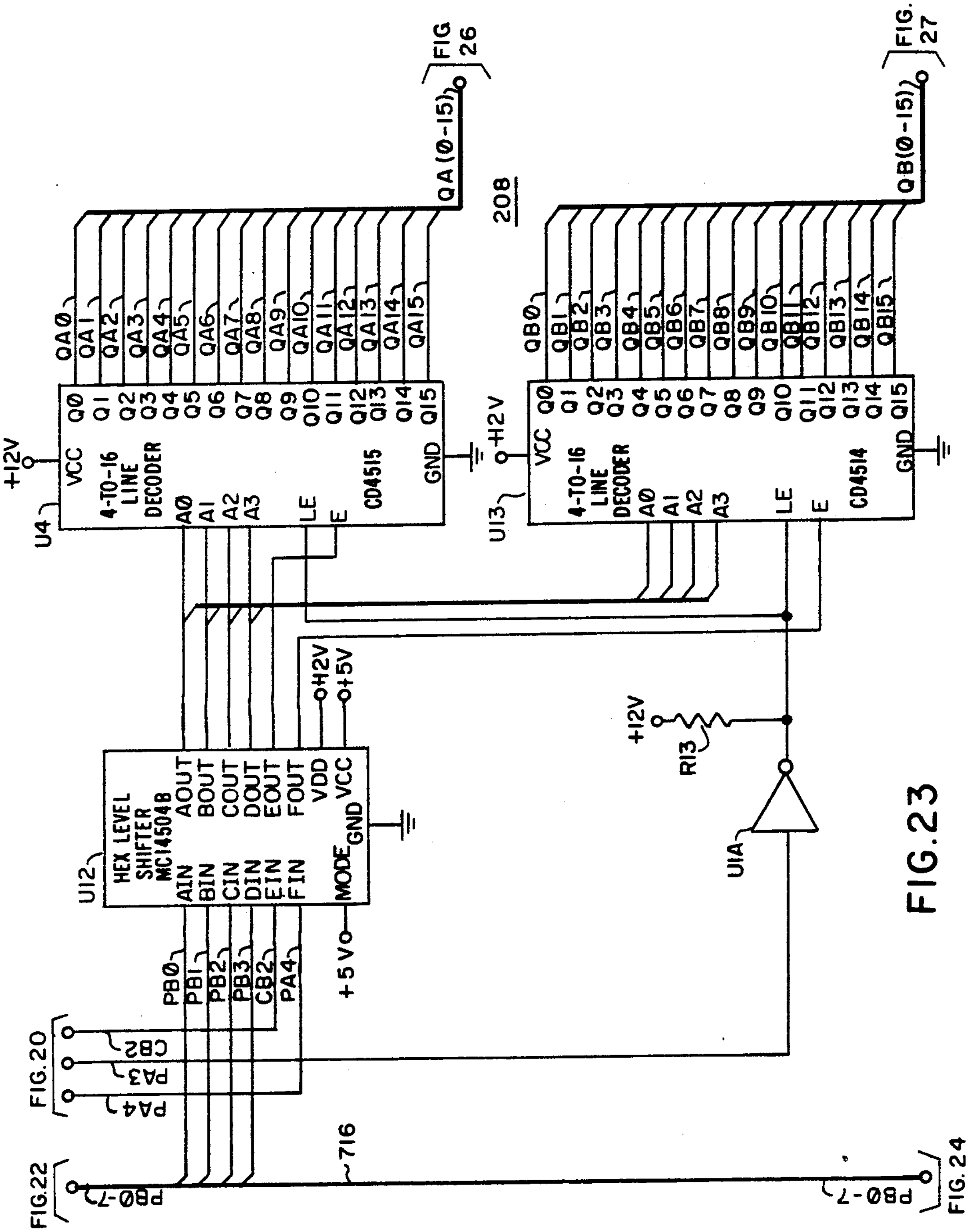
Figure 24:
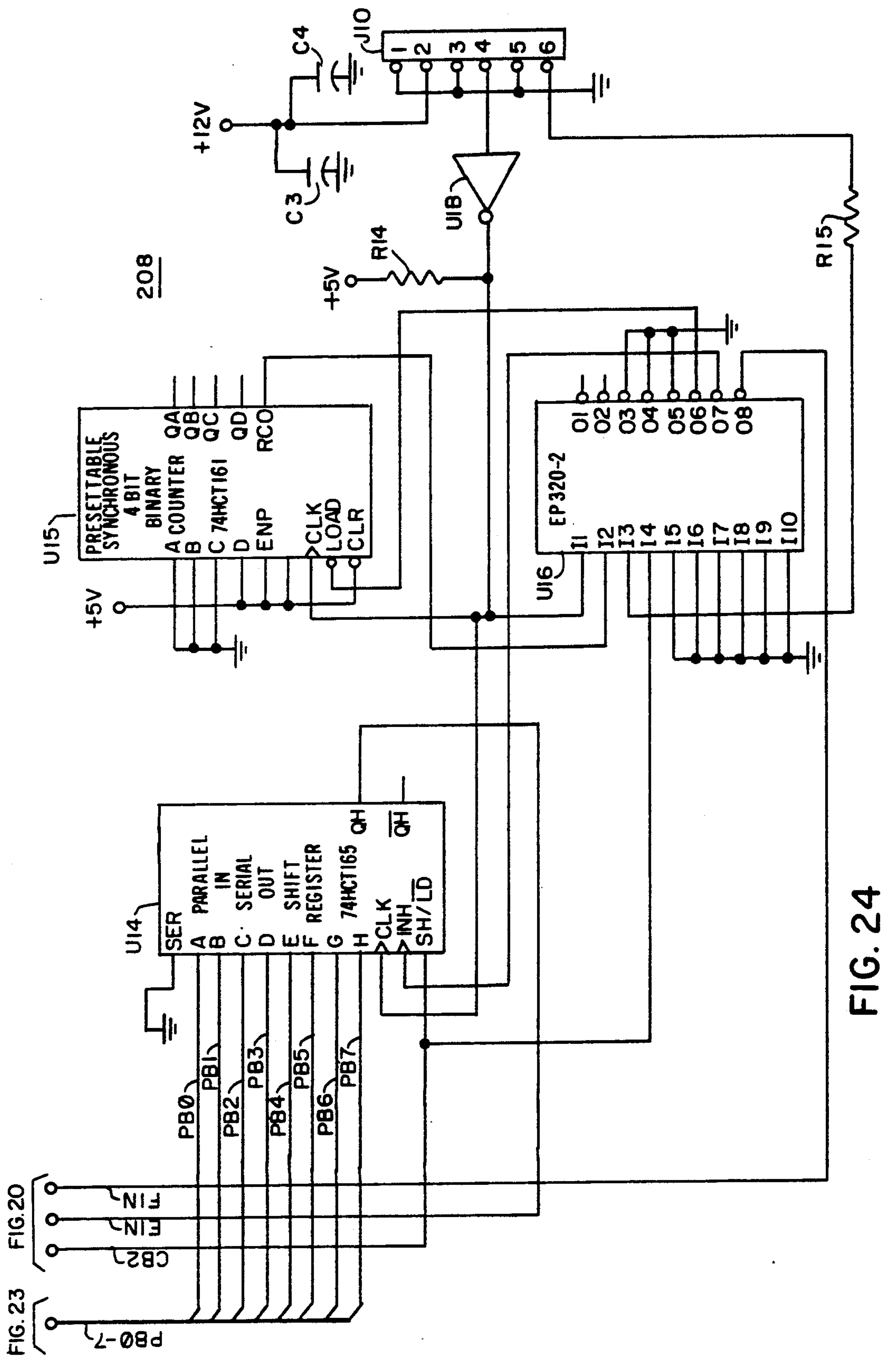

Referring now to the front panel interface board 208, and, in particular, to FIG. 20 which discloses a portion of the circuitry on that board, a portion of the interface unit shown in FIG. 20 includes inverters 700, 702, 704 and 706 which respectively drive the please-make-selection lamp 228, the processing-selection lamp 230, the thank-you lamp 232, and the beeper 226 on the door 52. A level shifter 710 receives signals on a plurality of lines PA0 through PA3 and outputs them on lines AOUT through DOUT data and CKK. Similarly, a level shifter 712 receives data on lines 1A1 through 6A1 and outputs it at lines PB0 through PB5. A bus PB0 through PB7, space 716, drives an octal latch peripheral driver 718, octal latch peripheral driver 720, and an octal latch peripheral driver 722, shown in FIG. 21, which, in turn, feed output connectors shown in FIGS. 25 and 26. Similarly, as may best be seen in FIG. 22, an octal latch peripheral driver 730 is driven from the bus 716, as is an octal buffer 732 feeding a pair of level shifters 734 and 736 which drive the connectors on FIGS. 25 and 26.

Figure 25:
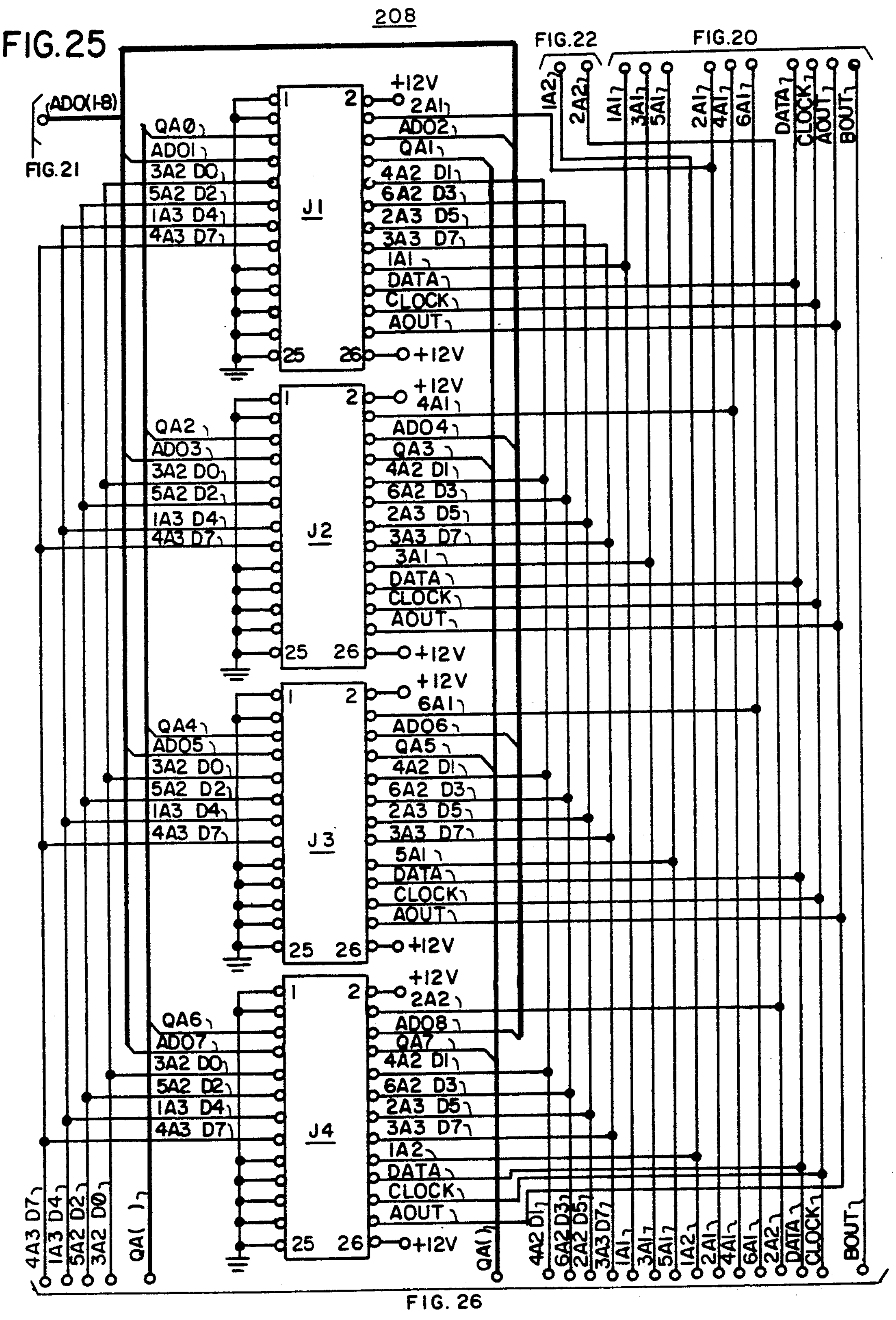
Figure 26:
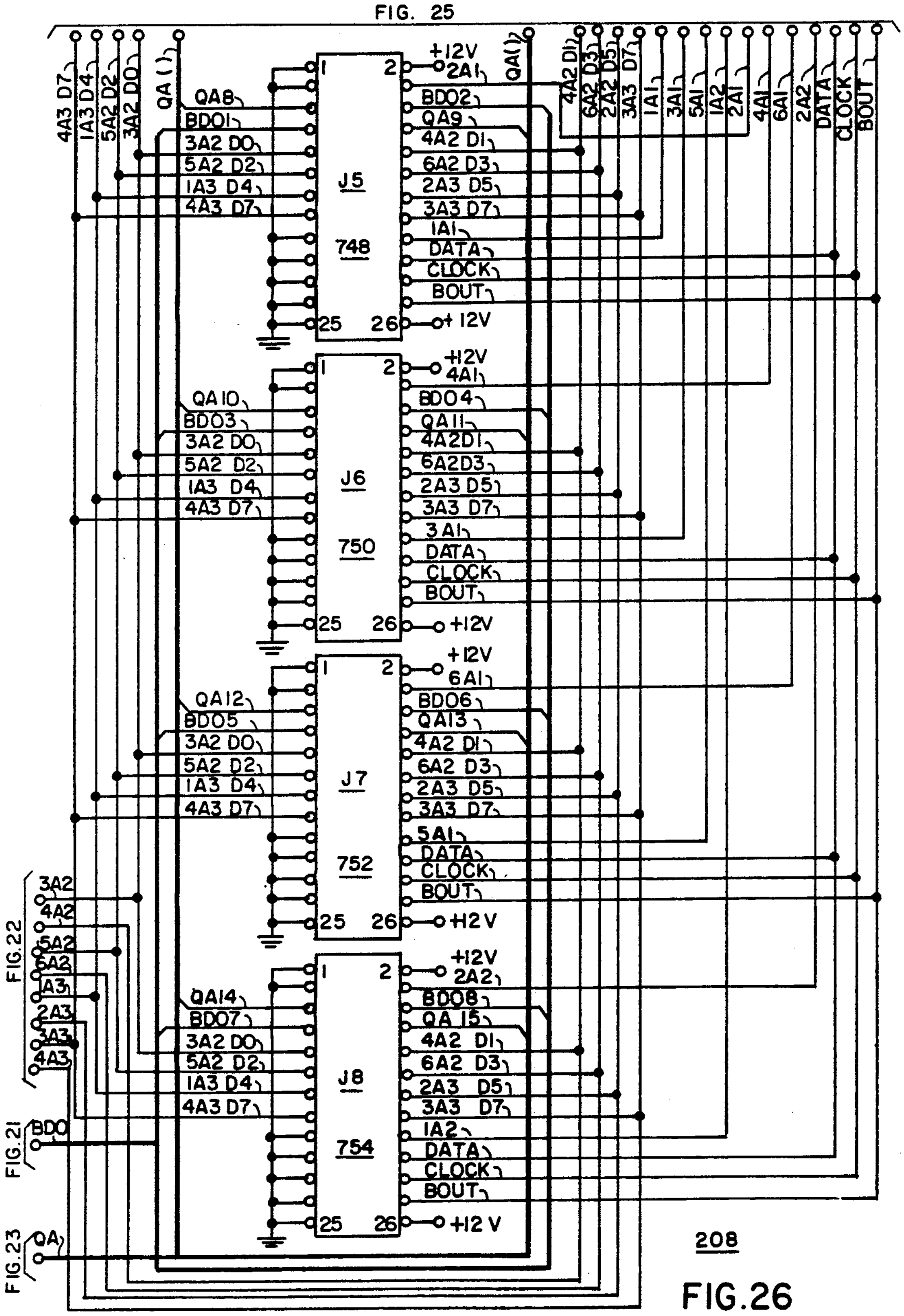
Figure 27:
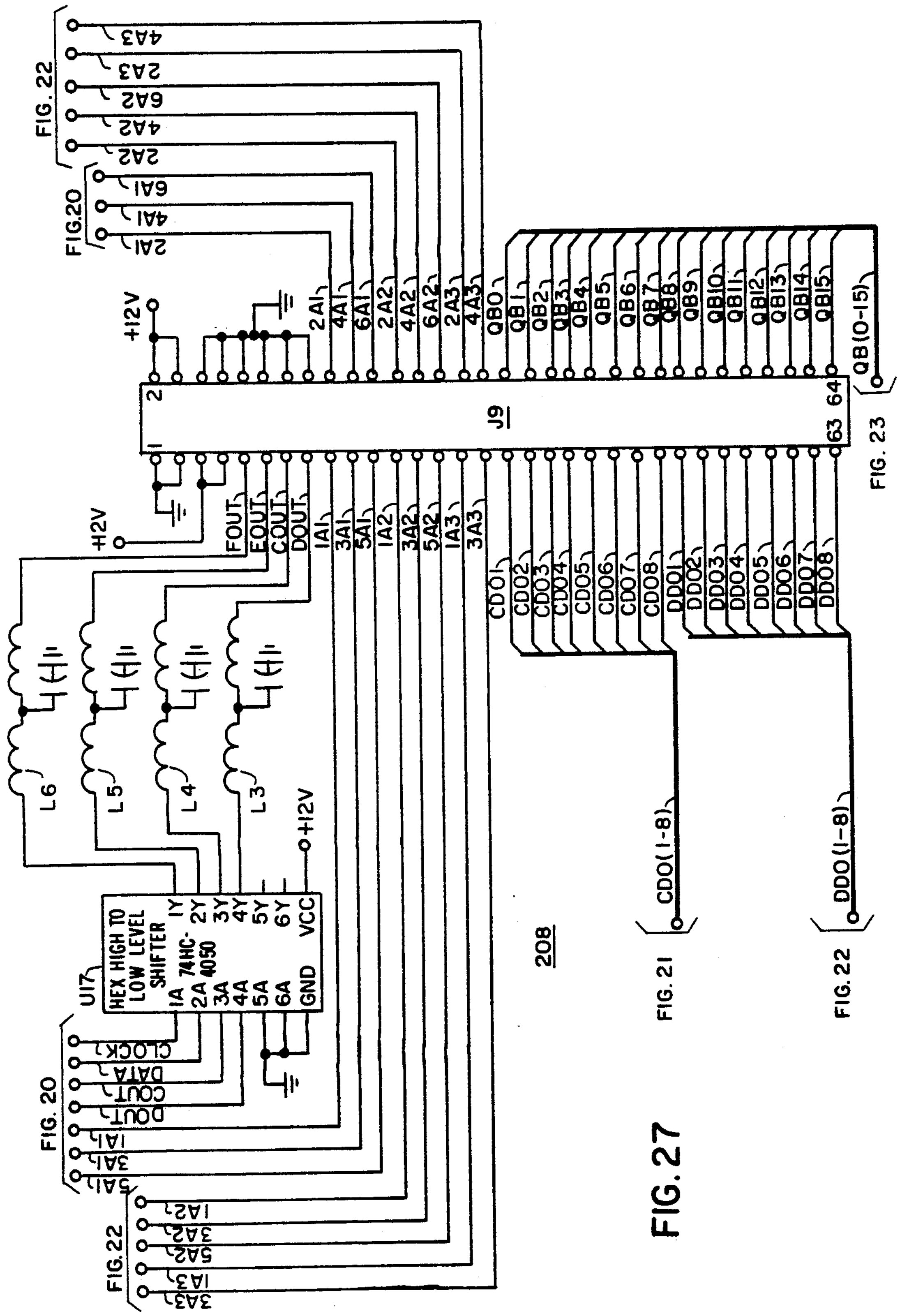
Figure 40:
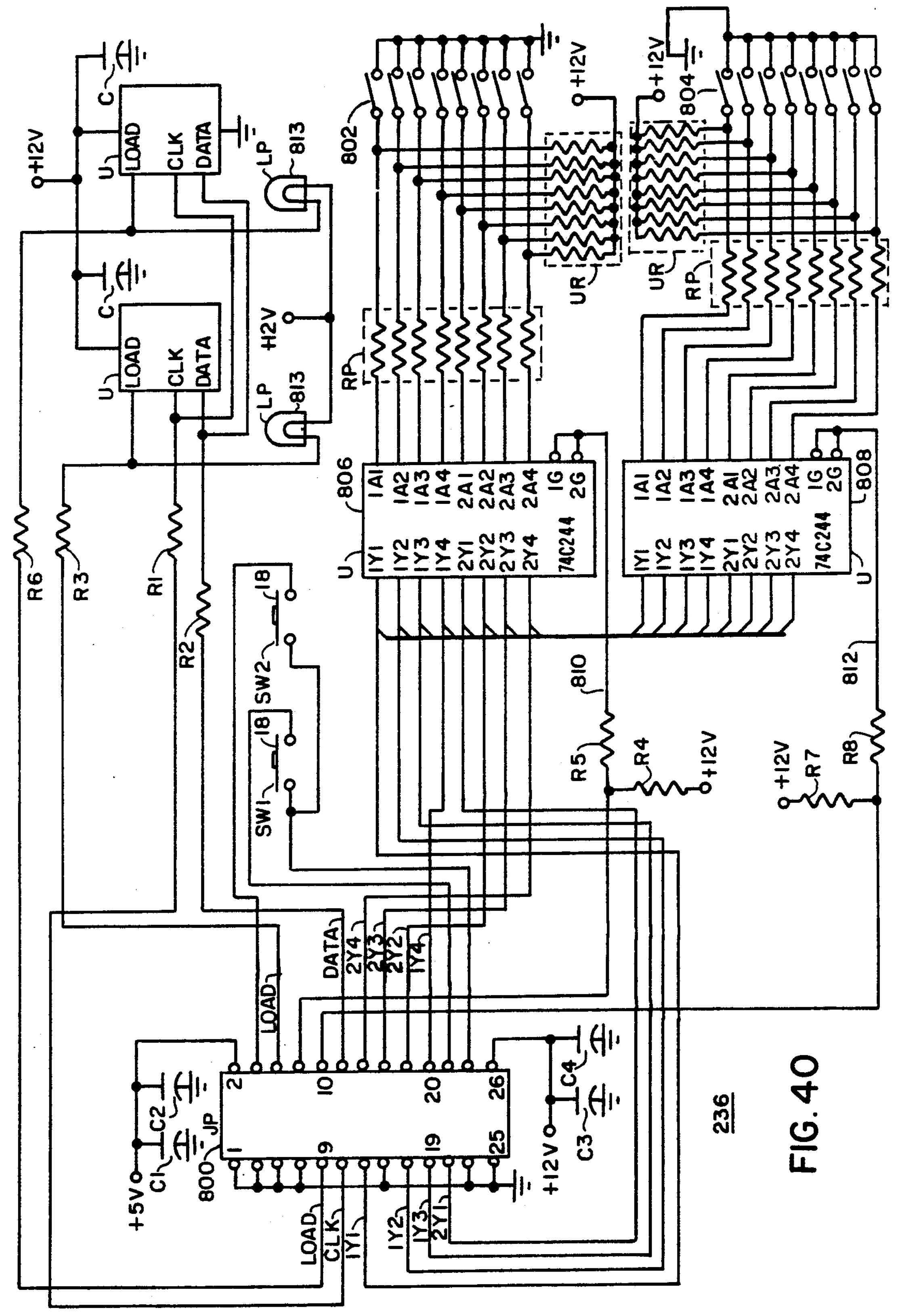
FIG. 40 is a schematic diagram of a front panel unit.
Figure 41:
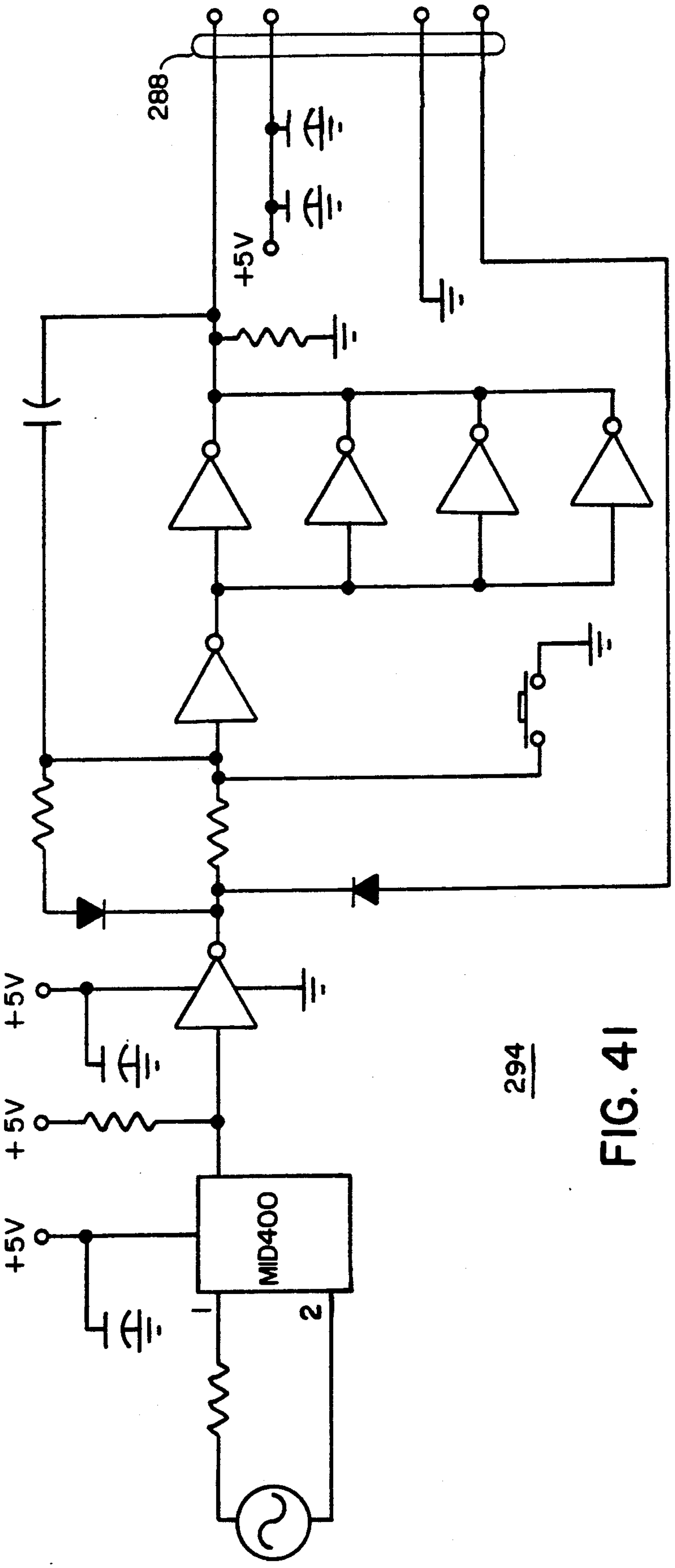
FIG. 41 is a schematic diagram of a power failure detection module.
Figure 42:
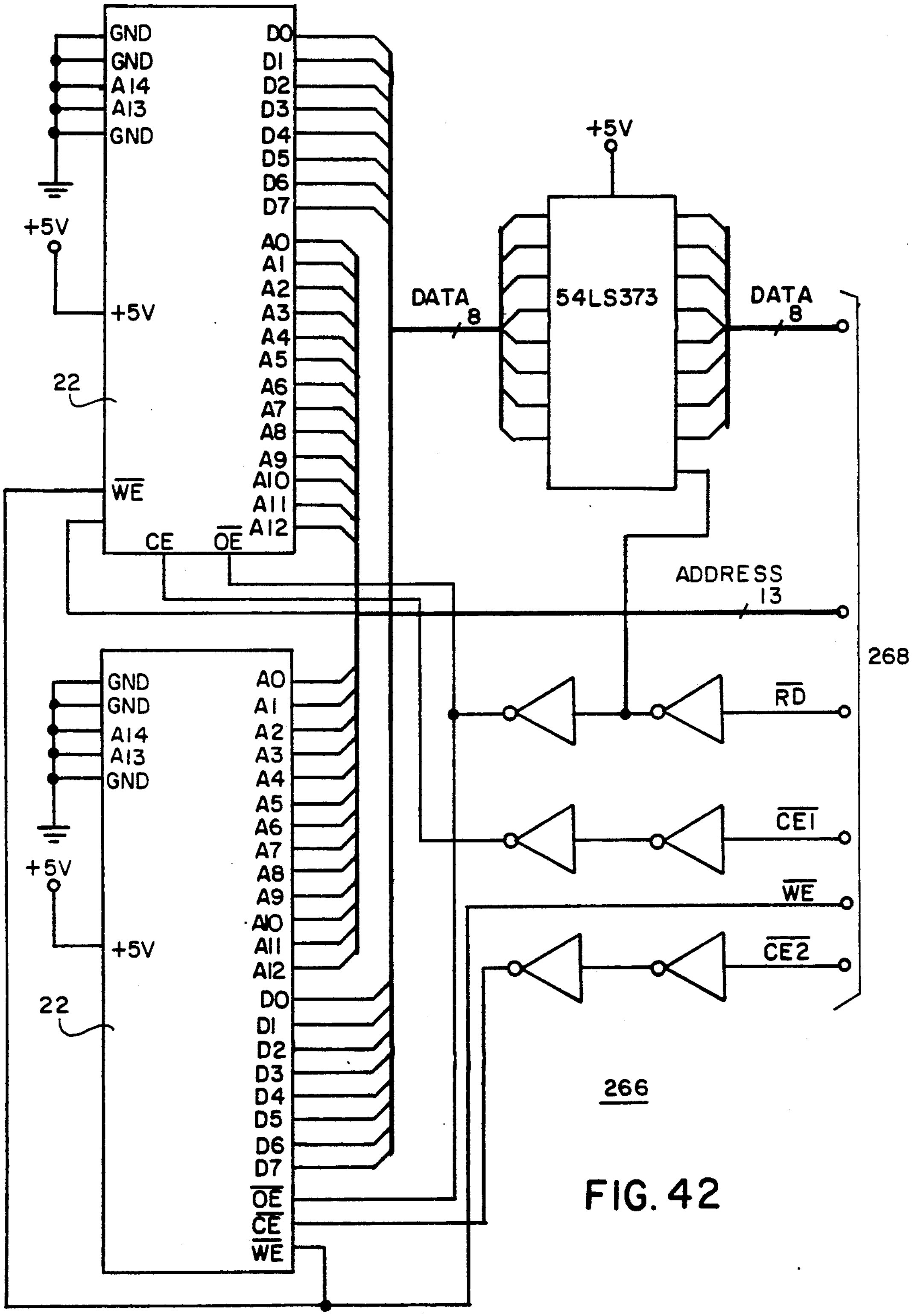
FIG. 42 is a schematic diagram of a data cartridge interface unit shown connected to a pair of MOS RAMS.

Referring now to FIGS. 25 and 26, a plurality of connectors 740, 742, 744, 746, 748, 750, 752 and 754 are shown thereon, and are substantially connected and parallel with each other to drive output boards, an exemplary one of which is shown in FIG. 40 as front panel board. Each of the boards 236 has a connector 800 thereon which is coupled to a respective one of the connectors 740 through 754. The interconnect unit 239 is substantially similar to the interconnect shown if FIGS. 25 and 26.

As may best be seen in FIG. 40, the board 236 has a first plurality of switches 802 and a second plurality of switches 804. The switches 802 are closed at the perforations in the transparency 56 placed in the appropriate sensor. The switch status is then sensed by a 74C244 octal latch 806 connected to the switches 802 and a 74C244 octal latch 808 connected to the switches 804. The octal latches 806 and 808 are respectively enabled by signals on lines 810 and 812 received from the interface unit 208. The outputs are fed back to the interface units 208 where they are fed to the front panel microcomputer which either scans each of the product sensors 802 and 804 on the boards 236 and 238 sequentially in order to determine what product flavors are available for selection on the board, or causes scanning to take place when the switches 18 are closed, indicating that a product selection has been made. A pair of out-of stock lamps 813 may be illuminated when the inventory for a particular transparency has been exhausted.

The microcomputer 186 operates under the control of the program code contained at pages 1A through 147A. The microcomputer 198, which performs the front panel functions through the interface unit 208, is operating under the control of the code shown at pages 148A through 178A of the Appendix.

It is apparent that the instant apparatus 10 may be filled with magazines which are factory loaded.

Figure 5A:
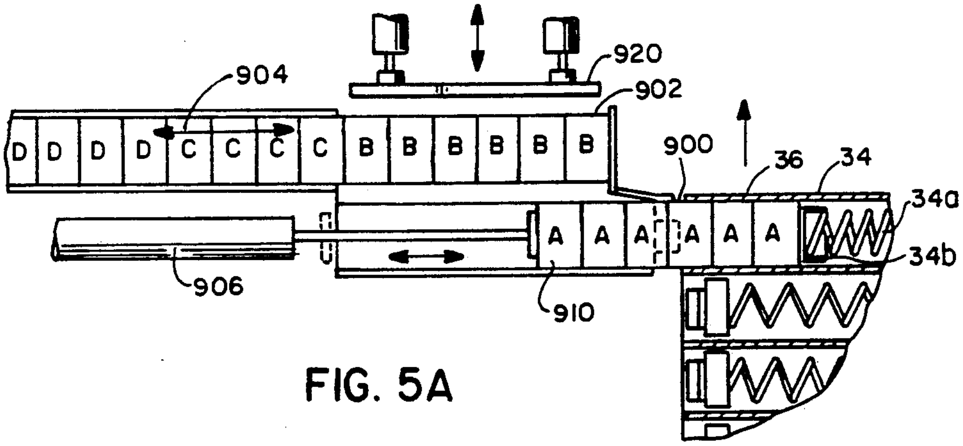
FIG. 5A is a schematic showing of an apparatus for loading frozen ice cream into a bin of a magazine.
Figure 5B:
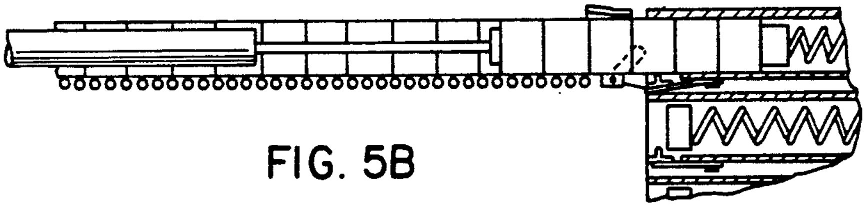
FIG. 5B is a side elevational view of the apparatus of FIG. 5A.
Figure 6:
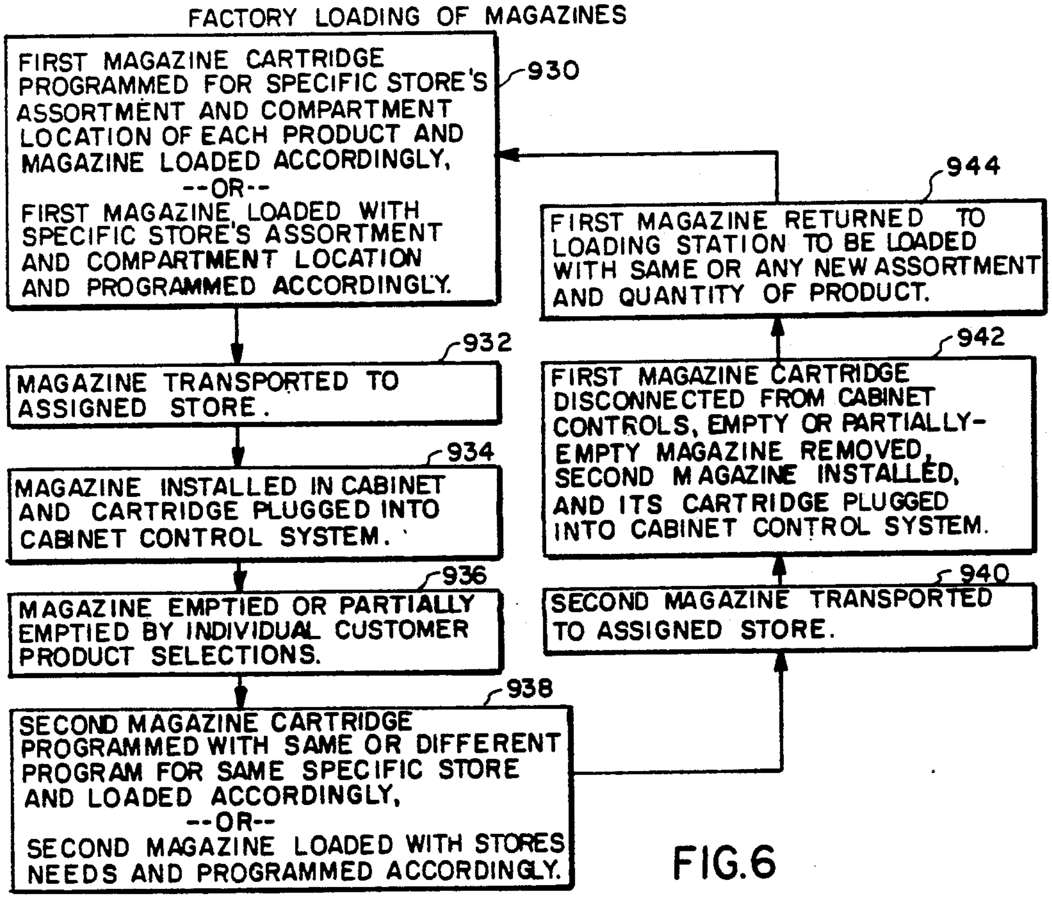
FIG. 6 is a flow chart showing details of the method of loading the magazine with frozen comestibles.

Referring now to FIGS. 5A, 5B and 6, a schematic showing is made in FIGS. 5A and 5B of the method of factory loading magazines. It may be appreciated that six cartons of ice cream at a time may be loaded. The first six cartons 900 are labeled A. The second six cartons 902 are labeled B. Four cartons of ice cream 904 are labeled C. In a first step, the plurality of cartons is inserted into a bin 36 of a magazine 34 against the force supplied by a compression spring 36*a* acting on a ram 36*b*. A hydraulic pusher 906 forces the ice cream packages 900 into the bins 36 where the leaf spring latch 130, which is not shown, will hold the last carton 900 in place. The second plurality 902 will then be in position, the ram 906 will withdraw, and a ram 920 will move all of the cartons 902 into a loading position from which they can be loaded into the next bin 36. It may be appreciated that the cartons 900 may, for instance, contain vanilla ice cream, the cartons 902 may contain chocolate ice cream, and the cartons 904 may contain peppermint ice cream. Each flavor ice cream may be loaded under control of information stored in a data cartridge 22, or a duplicate thereof, so that the information in the data cartridge 22 corresponds to the contents of each of the bins 36. Thus, as shown in FIG. 6 in a first step 930, the first magazine is loaded with the product and the data cartridge 22 is programmed accordingly. The magazine may be transported to the assigned store at which point it is loaded into the apparatus 10 along with the data cartridge 22. The data cartridge 22 is then plugged into the cartridge interface 266 in a step 934. Information is loaded into the system 10 and the magazine may be emptied by operation of the apparatus 10 by consumers in a step 936. As that emptying is taking place, a second magazine may be loaded at the factory in a step 938 and transported to the store in a step 940. The first magazine may be unloaded from the cabinet 12 as and the data cartridge 22 is disconnected in a step 942 and returned to the factory for reloading in a step 944. Thus, a magazine is maintained in the interior 14 of the apparatus 10 at all times so that product is available.

Figure 7A:
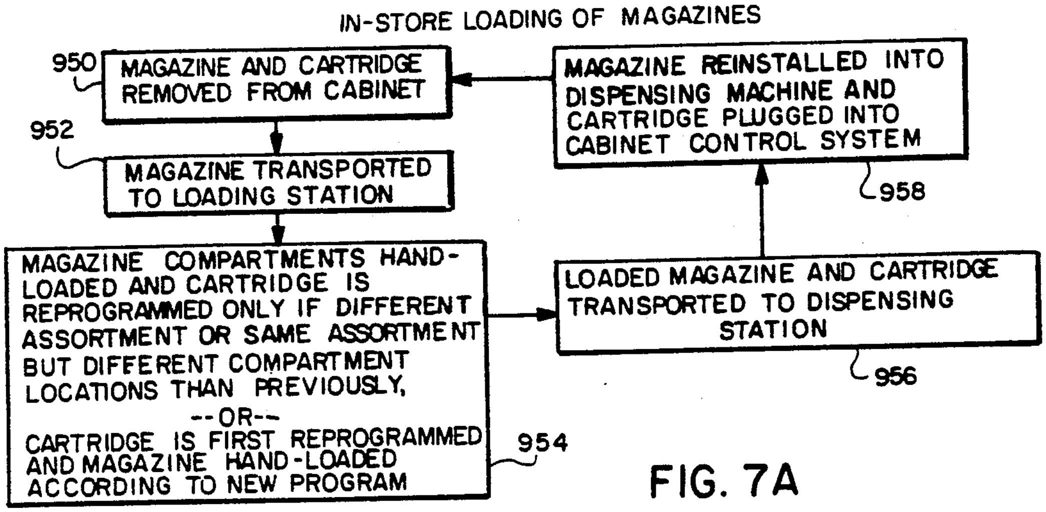
FIG. 7A is a flow chart showing the details of in-store loading of a filled magazine into an empty dispenser unit.

In an alternative embodiment, one of the magazines 32 or 34 may be loaded in the store. The magazine and data cartridge 22 may be removed from the cabinet 12 in a step 950. The magazine may be transported to a loading station in a step 952, at which point, in a step 954, the magazine may be hand-loaded with ice cream packages and the data cartridge 22 may be reprogrammed if there is a differing assortment of ice cream placed therein. The loaded magazine and reprogrammed data cartridge 22 may be retransported to the apparatus 10 in a step 956 and may be loaded into the apparatus 10 in a step 958, as is best seen in the flowchart of FIG. 7A.

Figure 7B:
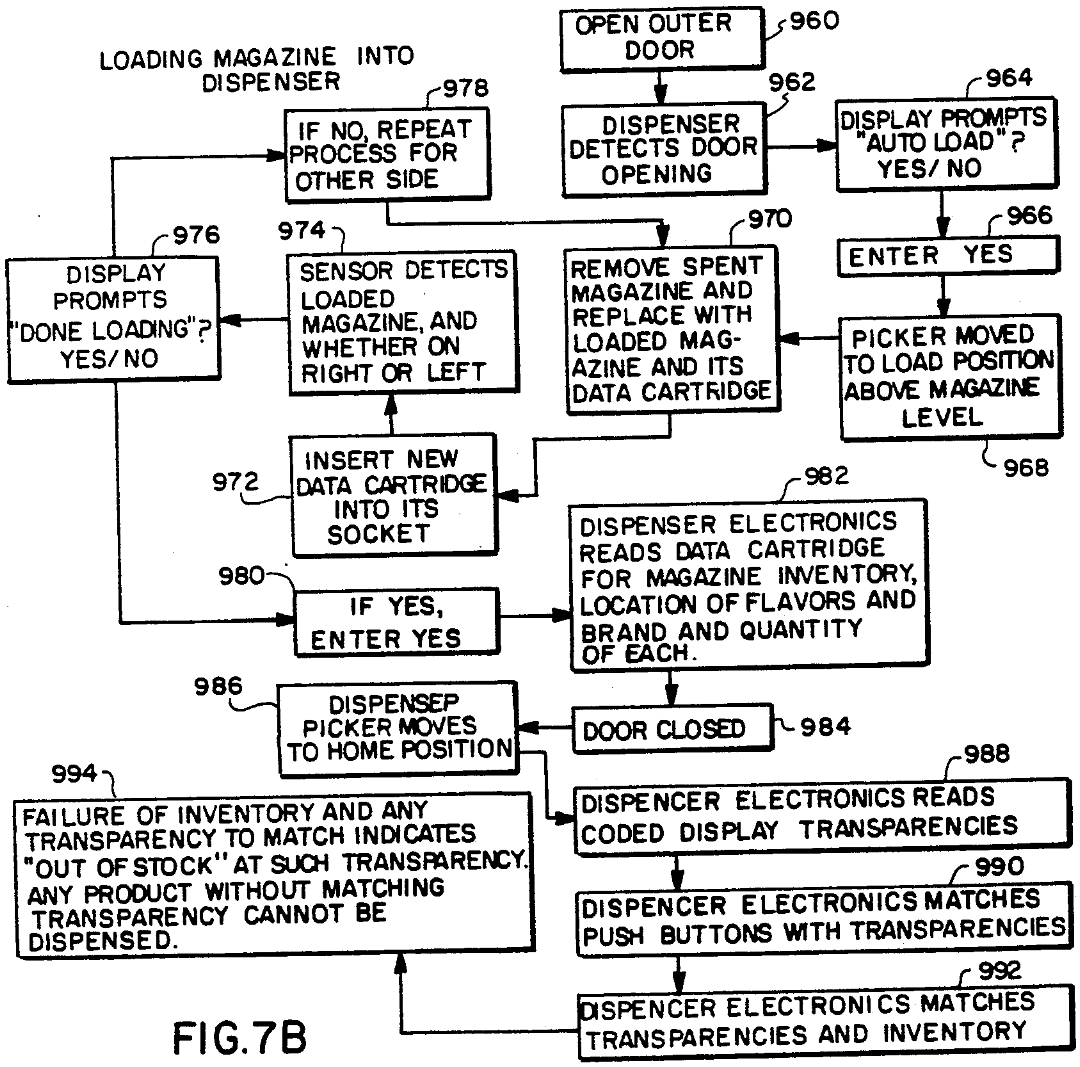
FIG. 7B is a flow diagram showing the details of loading the magazine assemblies into the dispenser including transferring information from data cartridges into a dispenser memory.

The flowchart of FIG. 7B displays the detailed loading of the magazine into the dispenser 10 One of the outer doors 50 or 52 is opened, in a step 960, at which point the microcomputer 186, in a step 962, detects the door opening and the display 268, in a step 964, prompts "AUTOLOAD YES or NO?". The user may then enter the YES command on the keyboard 274, in a step 966, and the picker assembly 28 is moved to the load position, which is above the magazine level, so that it is completely clear of the magazines when they are placed in the interior 14, in a step 968. At that point, in a step 970, the spent magazine 32 or 34 is removed, along with its associated data cartridge 22 and a loaded magazine is replaced with its data cartridge 22. In a step 972, the new data cartridge 22 is connected to the data cartridge interface 266. The magazine switches 300, in a step 974, indicate to the microcomputer 186 that a magazine has been loaded either on the left- or right-hand side of the cabinet interior 14. The display 268 then prompts the loader, in a step 976, as to whether loading has been completed or not. In the event loading has not been completed, the microcomputer 186 proceeds to a step 978 wherein step 970 is repeated and the rest of the loop is repeated. In the event that a YES answer is made to the display prompt from the step 976, control is transferred to a step 980. The microcomputer 186, in a step 982, then causes the data in the data cartridge 22 to be loaded into the memory 258 so that an inventory of the contents of each of the bins 36 is available. The door may then be closed in a step 984. It may be appreciated that, whenever either of the magazines 32 or 34 is moved, the associated data cartridge 22 is then reread when the inner door 40 or 42 is closed in order to make certain that the most current information related to the contents of the magazines 32 and 34 is contained in the memory 258. After the step 984, the picker 28, under the control of the microcomputer 186, is moved in a step 986 to its home position where it is ready for operation.

Following movement of the picker assembly 28 to the home position, the front panel microcomputer 198, via the interface unit 208, scans the food product code sensors 20 in a step 988 and associates the identified product codes from the transparencies 56 with the food product selection switches 18 in a step 990. In a step 992, the inventory information, stored in the memory 258 from the data cartridge 22, is then associated with the indicated selections available from the transparencies 56 in the step 990. In the event that one of the transparencies 56 does not have corresponding inventory information stored in the memory 258, an out-of-stock lamp is lit in a step 994.

Figure 14:
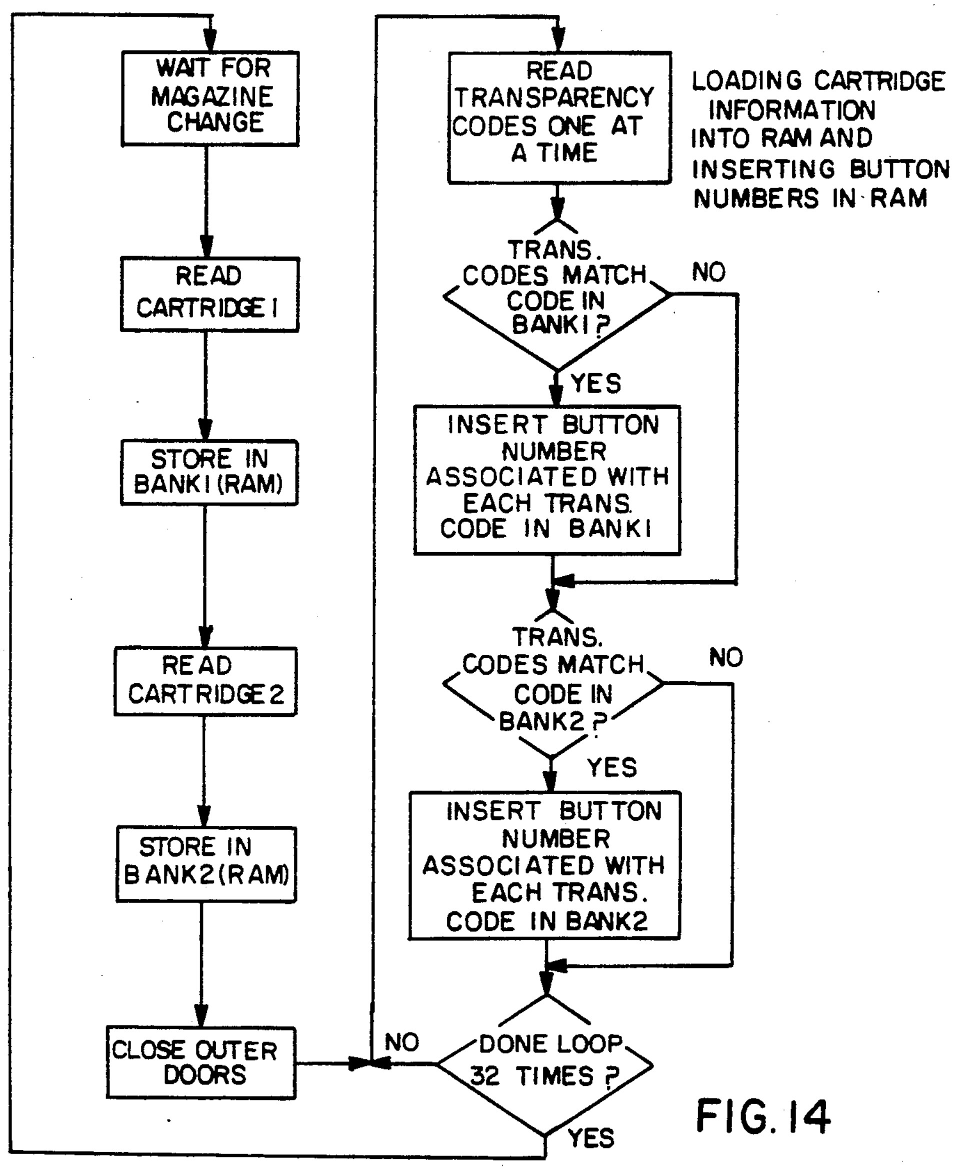
FIG. 14 is a flow diagram of the method by which cartridge information is loaded into a random access memory in the apparatus of FIG. 1.
Figure 15:
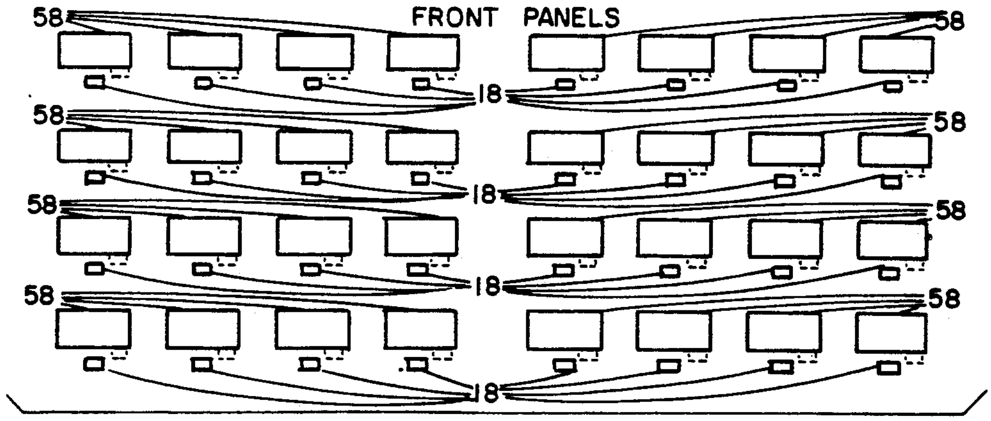
FIG. 15 is a schematic showing of the customer displays and associated information entry switches comprising the keyboard.

As may best be seen in FIG. 14, more specifically when the data cartridges 22 are read in a step 1003, if the magazine has been moved control is transferred to a step 1004. In step 1004, the first cartridge 22 is read and its contents are stored in the memory 258 in a step 1006. The second cartridge 22 is read in a step 1008 and its contents are stored in the memory 258 in a step 1010. The outer doors 50 and 52 are then closed by the user and the transparency codes from the food product code sensors 20 are read in the step 1014. The transparency codes are compared with the inventory indicated in the step 1006 and a test is made in the step 1018 to see if the codes match. In a step 1020, the identification for the food product selection switches 18, corresponding to each of the transparencies, is then loaded into the memory 258 and the transparency codes, indicative of the products to be selected, are compared with the product characteristics stored in RAM in a step 1024. In a step 1028 a test is made if all buttons have been scanned for set-up, if so control is transferred to step 1003 to await moving the magazines. If not, the loop is repeated until all 32 buttons have been scanned.

The arrangement of the magazine bins is set forth for each magazine in FIG. 16 and the bin positions or relative magazine positions are set forth in FIG. 17 identifying the rows and columns to which the picker assembly 28 must travel in order to remove material from the magazine bins and also to make deliveries at the left delivery door 30 and the right delivery door 30.

It may thus be appreciated that the apparatus 10 provides a storage and dispensing unit 10 for frozen comestibles which receives the comestibles in a frozen condition, maintains them in that condition, and then allows quick and easy product selection to be made by the handling means 28 under the control of the microcomputer 186. Since the handling means 28 is maintained at the same temperature as is the magazines 32 and 34, no melting of the frozen comestible or ice cream takes place when the comestible is selected. The system 10 also obviates the handling of frozen comestibles by one searching for a particular flavor, causing the searching to be done completely electronically and an indication to be made to the customer if a particular product selection has been exhausted.

While there have been illustrated and described particular embodiments of the present invention, it will be appreciated that numerous changes and modifications will occur to those skilled in the art which fall within the true spirit and scope of the present invention

What is claimed is:

1. An apparatus for storing frozen comestibles within and dispensing comestibles from a plurality of bins in a magazine comprising:

a cabinet having a frozen comestible opening extending from an interior thereof to an exterior thereof;

a dispenser tray located in registration with said frozen comestible opening and mounted for movement between a first position and a second position;

cooling means coupled to said cabinet for cooling the interior of said cabinet;

a frozen comestible holding area in the bottom interior of said cabinet;

a picker assembly located in the interior of said cabinet, said picker assembly having a frozen comestible handler movable into registration with dispensing positions of the magazine for receiving a frozen comestible and movable thereafter into registration with said dispenser tray to deposit said frozen comestible on said dispenser tray when said dispenser tray is in said first position; and means for causing said dispenser tray to move to said second position after a predetermined period of time to deliver said frozen comestible to said holding area.

2. An apparatus for storing frozen comestibles within and dispensing frozen comestibles from a plurality of bins in a magazine, as defined in claim 1, wherein said frozen comestible dispensing opening extends through an inner thermal door to an outer door.

3. An apparatus for storing frozen comestibles within and dispensing frozen comestibles from a plurality of bins in a magazine, as defined in claim 10, wherein said cooling means comprises a refrigeration system.

4. An apparatus for storing frozen comestibles within and dispensing frozen comestibles from a plurality of bins in a magazine, as defined in claim 1, wherein said picker assembly comprises a first picker and a second picker.

5. An apparatus for storing frozen comestibles within and dispensing frozen comestibles from a plurality of bins in a magazine, as defined in claim 4, wherein said picker assembly is movable horizontally and vertically.

6. An apparatus for storing frozen comestibles within and dispensing frozen comestibles from a plurality of bins in a magazine, as defined in claim 4, wherein said picker assembly is refrigerated by said cooling means.

* * * * *